(12) United States Patent
Goldsmith et al.

(10) Patent No.: US 8,937,884 B2
(45) Date of Patent: Jan. 20, 2015

(54) INTERFERENCE-COGNITIVE TRANSMISSION

(71) Applicant: Quantenna Communications, Inc., Fremont, CA (US)

(72) Inventors: Andrea Goldsmith, Menlo Park, CA (US); Ravi Narasimhan, Synnyvale, CA (US)

(73) Assignee: Quantenna Communications Inc., Fremont, CA (US)

( * ) Notice: Subject to any disclaimer, the term of this patent is extended or adjusted under 35 U.S.C. 154(b) by 47 days.

(21) Appl. No.: 13/716,138

(22) Filed: Dec. 15, 2012

(65) Prior Publication Data

US 2013/0136159 A1 May 30, 2013

Related U.S. Application Data

(63) Continuation of application No. 12/754,578, filed on Apr. 5, 2010, now Pat. No. 8,358,588.

(51) Int. Cl.
*H04L 1/00* (2006.01)
*H04B 1/00* (2006.01)
*H04L 25/08* (2006.01)
*H04B 15/00* (2006.01)
*H04B 7/02* (2006.01)
*H04B 7/04* (2006.01)
*H04B 7/06* (2006.01)

(52) U.S. Cl.
CPC ............... *H04B 15/00* (2013.01); *H04B 7/024* (2013.01); *H04B 7/0417* (2013.01); *H04B 7/0452* (2013.01); *H04B 7/0626* (2013.01); *H04B 7/063* (2013.01); *H04B 7/0465* (2013.01)

USPC .......... 370/252; 375/144; 375/148; 375/346; 375/350

(58) Field of Classification Search
None
See application file for complete search history.

(56) References Cited

U.S. PATENT DOCUMENTS

| | | | |
|---|---|---|---|
| 6,141,567 A * | 10/2000 | Youssefmir et al. | 455/562.1 |
| 7,372,890 B2 * | 5/2008 | Batra et al. | 375/130 |
| 2006/0077080 A1 * | 4/2006 | Yamauchi | 341/114 |
| 2007/0140374 A1 | 6/2007 | Raleigh | |
| 2008/0227397 A1 * | 9/2008 | Prasad et al. | 455/63.1 |
| 2008/0291981 A1 * | 11/2008 | Jonsson et al. | 375/148 |
| 2009/0003379 A1 * | 1/2009 | Shao et al. | 370/466 |
| 2009/0073961 A1 * | 3/2009 | Jayapalan et al. | 370/352 |
| 2009/0111399 A1 * | 4/2009 | Norris et al. | 455/114.3 |
| 2009/0312043 A1 * | 12/2009 | Shah et al. | 455/501 |
| 2010/0067366 A1 * | 3/2010 | Nicoli | 370/210 |

(Continued)

FOREIGN PATENT DOCUMENTS

EP 2043281 A1 4/2009
TW 200529589 9/2005

(Continued)

*Primary Examiner* — Edan Orgad
*Assistant Examiner* — Rebecca Song

(57) ABSTRACT

Interference cognitive devices are described. An interference cognitive device can be collocated with a transmitter of an interference cognitive transmitter (ICT), as receive chains or portions thereof at the ICT. An interference cognitive device can also be remote with respect to the transmitter, which operates in an interference cognitive network and receives data directly or indirectly from the interference cognitive device. The ICT uses the data to mitigate interference while continuing to operate in accordance with a performance metric.

5 Claims, 11 Drawing Sheets

(56) References Cited

U.S. PATENT DOCUMENTS

2010/0093385 A1* 4/2010 Kazmi et al. .................. 455/517
2010/0162075 A1* 6/2010 Brannstrom et al. ......... 714/752

FOREIGN PATENT DOCUMENTS

| WO | WO2005060123 A1 | 6/2005 |
|----|-----------------|--------|
| WO | WO2008084800 A1 | 7/2008 |

* cited by examiner

INTERFERENCE-COGNITIVE TRANSMISSION

CROSS-REFERENCE TO RELATED APPLICATIONS

This application claims priority to U.S. patent application Ser. No. 12/754,578 filed on Apr. 5, 2010, which is incorporated herein by reference in its entirety as if fully set forth herein. This application is related to U.S. patent application Ser. No. 12/630,814, filed Dec. 3, 2009 which is incorporated by reference.

BACKGROUND

Multiple-input multiple-output (MIMO) processing has gained widespread adoption as an effective means to increase throughput and reliability. For instance, the Institute of Electrical and Electronics Engineers (IEEE) 802.11n wireless local area network (WLAN) standard combines MIMO processing with orthogonal frequency-division multiplexing (OFDM) to address the demand for reliable wireless broadband services, such as high-definition television and video-conferencing. MIMO techniques can be used either to improve robustness of the link via spatial diversity or increase data rates via spatial multiplexing. Furthermore, a combination of diversity and multiplexing techniques can be used to trade off reliability and data rate.

Most wireless systems require a receiver to estimate wireless channel response, also known as channel state information (CSI), before decoding transmitted data. The receiver typically estimates CSI using training sequences sent along with the data. In many situations, it is also possible for the transmitter to obtain CSI estimates. For instance, the IEEE 802.11n WLAN standard supports CSI feedback from the receiver to the transmitter. It is well known that the information capacity of a wireless system increases if CSI is available at the transmitter. Given CSI, a MIMO transmitter can adjust the gains and phases (i.e., weights) of each transmit antenna to steer energy in optimal directions towards the receiver. Such steering of energy is often called transmit precoding or beamforming. Transmit precoding can be used for one or more spatial data streams. A MIMO receiver can use CSI to compute the optimal weights for each receive antenna to maximize the signal quality of each data stream.

Conventional precoding techniques determine the optimal transmit antenna weights based on maximizing throughput or reliability in the presence of spatially isotropic additive white Gaussian noise (AWGN). However, in many deployment scenarios, interference is often several times stronger than the background AWGN. Interference causes significant loss of reliability and throughput for wireless systems. Many interference sources have distinct spatial, temporal, and frequency signatures. However, traditional approaches to interference mitigation, such as carrier frequency scanning and hopping, do not effectively exploit the characteristics of the interference. Furthermore, a lack of available frequencies may limit the applicability of frequency hopping.

SUMMARY

The following is described and illustrated in conjunction with systems, tools, and methods that are meant to be exemplary and illustrative, not limiting in scope. Techniques are described to address one or more of deficiencies in the state of the art.

Interference cognitive devices are described. An interference cognitive device can be collocated with a transmitter of an interference cognitive transmitter (ICT), as receive chains or portions thereof at the ICT. An interference cognitive device can also be remote with respect to the transmitter, which operates in an interference cognitive network and receives data directly or indirectly from the interference cognitive device. The ICT uses the data to mitigate interference while continuing to operate in accordance with a performance metric.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. in other instances, well-known implementations or operations are not shown or described in detail to avoid obscuring aspects of the claimed subject matter.

Figure 1:
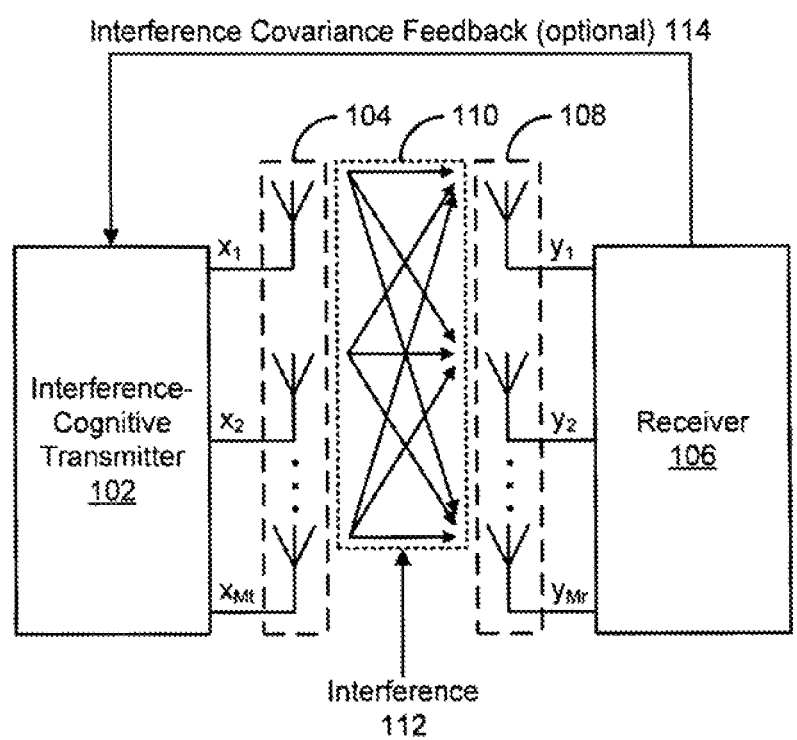
FIG. 1 depicts an example of a system with an interference-cognitive transmitter (ICT).

FIG. 1 depicts an example of a system with an interference-cognitive transmitter (ICT). The system 100 includes an ICT 102 with a transmit (Tx) antennae array 104 and a receiver 106 with a receive (Rx) antennae array 108. The components 102, 104 can be implemented in a first station and the components 106, 108 can be implemented in a second station in a typical implementation, but the components could be implemented atypically in alternative implementations while still benefiting from the described techniques.

A station, as used in this paper, may be referred to as a device with a media access control (MAC) address and a physical layer (PHY) interface to a wireless medium that complies with the Institute of Electrical and Electronics Engineers (IEEE) 802.11 standard. In alternative embodiments, a station may comply with a different standard than IEEE 802.11, or no standard at all, may be referred to as something other than a "station," and may have different interfaces to a wireless or other medium, IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents.

It should be noted that multiple-input and single-output (MISO), single-input and multiple-output (SIMO), and single-input and single-output (SISO) are special cases of MIMO. MISO is when the receiver has a single antenna. SIMO is when the transmitter has a single antenna. SISO is when neither the transmitter nor the receiver have multiple antennae. As used in this paper, techniques may be applicable to any of these special cases, depending upon whether the techniques can be used with one Tx antenna and/or one Rx antenna. Thus, the acronym MIMO could be considered to include the special cases, if applicable. The techniques may also be applicable to multi-user MIMO (MU-MIMO), cooperative MIMO (CO-MIMO), MIMO routing, OFDM-MIMO, or other MIMO technologies.

The ICT 102 is adaptive in that it can optimize weights in response to interference, as described later. The ICT 102 is illustrated such that it does not necessarily have feedback from a receiver. However, the ICT 102 is still "adaptive" in the sense that it can adapt to detected interference; an ICT is an interference-adaptive transmitter (IAT), but an IAT is not necessarily an ICT. Where it is desirable to emphasize that the ICT has both the capabilities of an ICT and an IAT that has feedback from a receiver, the ICT can be referred to as a "good neighbor" IAT. Otherwise, it will be generally the case that an ICT may or may not have feedback from a receiver.

The ICT 102 may be capable of precoding, spatial multiplexing, and/or diversity coding. (For illustrative simplicity, it is assumed, unless explicitly stated, that the ICT 102 includes the Tx antennae array 104. Thus, the ICT 102 can be referred to as capable of functionality that requires the use of antennae.) Spatial multiplexing can be combined with precoding, e.g., when the channel is known at the transmitter or combined with diversity coding, e.g., when decoding reliability is in trade-off.

Precoding, as used in this paper, is used in conjunction with multi-stream transmission in MIMO radio systems. In precoding, the multiple streams of the signals are emitted from the transmit antennas with independent and appropriate weighting per each antenna such that some performance metric such as the link throughput is maximized at the receiver output. Note that precoding may or may not require knowledge of channel state information (CSI) at the transmitter. For example, the weights are optimized using CSI to maximize a given performance metric, a receiver might send back weights rather than CSI, antennae could be weighted equally without regard for CSI, etc. Some benefits of precoding include increasing signal gain on one or more streams through diversity combining, reducing delay spread on one or more streams, providing unequal signal-to-noise ratio (SNR) per stream for different quality of service (QoS).

Beamforming, as used in this paper, is a special case of precoding for a single-stream so that the same signal is emitted from each of the transmit antennas with appropriate weighting such that some performance metric such as the signal power is maximized at the receiver output. Some benefits of beamforming include increasing signal gain through diversity combining and reducing delay spread.

A MIMO antenna configuration can be used for spatial multiplexing. In spatial multiplexing, a high rate signal is split into multiple lower rate streams, which are mapped onto the Tx antennae array. If these signals arrive at an Rx antennae array with sufficiently different spatial signatures, the receiver can separate the streams, creating parallel channels. Spatial multiplexing can be used to increase channel capacity. The maximum number of spatial streams is limited by the lesser of the number of antennae at the transmitter and the number of antennae at the receiver. Spatial multiplexing can be used with or without transmit channel knowledge.

In the example of FIG. 1, the Tx antennae array 104 is operationally connected to the ICT 102. Generally as used in this paper, an antennae array includes multiple antennae coupled to a common source or load to produce a directive radiation pattern. The spatial relationship can contribute to the directivity of the antennae. The Tx antennae array 104 can also be used with a receiver to detect and/or measure interference. Optional interference covariance feedback 114 can be used with the measurements associated with the receiver at the ICT 102 to optimize precoding weights so as to enable "pointing" of transmissions from the Tx antennae array 104 in the direction of the receiver 106 while "pointing away" from the direction of the interfering device (or a receiver of the interfering device, if known).

In the example of FIG. 1, in operation, the Tx antennae array 104 has $x_k$ as input. The value of k varies from 1 to $M_t$, where $M_t$ is the number of antennae in the Tx antennae array 104. It may be noted that the Tx antennae array 104 may or may not also act as an Rx antennae array under certain circumstances that depend upon the implementation, configuration, and environmental variables. For example, the ICT 102 could act as a transceiver, alternating use of the Tx antennae array 104 as Tx antennae with use of the antennae array as Rx antennae. Thus, in the example of FIG. 1, the Tx designation could simply represent a current use of the antennae array for transmission. It may also be noted that in an alternative embodiment, an array could contemporaneously have a first subset of antennae acting as Tx antennae and a second subset of antennae acting as Rx antennae (not shown).

In the example of FIG. 1, the receiver 106 is an applicable known or convenient receiver. The receiver 106 could be implemented as an interference-adaptive receiver (IAR). With such an implementation, in operation, a carrier frequency is selected and, for example, channel and spatial interference covariance matrices are estimated at the receiver 106 (an IAR in this example). The qualities of the estimates are optionally computed. Where the qualities of the estimates are computed, adaptive components can be referred to as "robustly adaptive." The receiver 106 uses the estimates (and optionally their qualities) to determine the necessary signal processing for interference suppression at the receiver 106. The receiver 106 computes a performance metric, which is stored for the given carrier frequency. Optionally, this procedure is repeated for all available carrier frequencies. The carrier frequency with the best performance metric is then selected for data communication. The receiver 108 may optionally provide interference covariance (or other) feedback 114 to the ICT 102. The ICT 102 can use the estimates (and optionally their qualities) to compute, for example, a precoder for interference suppression at the ICT 102. The ICT 102 uses the precoder to transmit data to the receiver 106.

In the example of FIG. 1, the Rx antennae array 108 is operationally connected to the receiver 106. For illustrative simplicity, it is assumed, unless explicitly stated, that the receiver 106 includes the Rx antennae array 108. Thus, the receiver 106 can be referred to as capable of functionality that requires the use of antennae.

In the example of FIG. 1, in operation, the $x_k$ signals are transmitted over the MIMO channel 110 in $N_s$ independent spatial streams. Interference 112 can be introduced into the MIMO channel 110. Interference can come from a variety of different sources including, by way of example but not limitation, a wireless station (e.g., an access point (AP) or non-AP wireless station) or, more generally, any applicable wireless transmitter (potentially including devices that simply output wireless noise, such as a microwave oven).

In the example of FIG. 1, the Rx antennae array 1038 has $y_k$ as input signals. The input signals include the interference 112 introduced into the MIMO channel 110. The value of k (as a subscript of y) varies from 1 to $M_r$, where $M_r$ is the number of antennae in the Rx antennae array 108. It may be noted that the Rx antennae array 108 may or may not also act as a Tx antennae array under certain circumstances that depend upon the implementation, configuration, and environmental variables. For example, the receiver 106 could act as a transceiver, alternating use of the Rx antennae array 108 as Rx antennae with use of the antennae array as Tx antennae. Thus, in the example of FIG. 1, the Rx designation could simply represent a current use of the antennae array for transmission. It may also be noted that in an alternative embodiment, an array could contemporaneously have, a first subset of antennae acting as Tx antennae and a second subset of antennae acting as Rx antennae (not shown).

In the example of FIG. 1, in order to illustrate the cognitive capabilities of the ICT 102, the interference 112 includes interference from an external device, such as, by way of example but not limitation, a wireless device on a different channel. The ICT 102 is cognitive because it can learn about and suppress interference to unintended recipients of transmitted signals (such as a device that is responsible for some of the interference on a channel). A principle of channel reciprocity is that a forward link channel (e.g., from the ICT 102 to the external device) is approximately equal to the reverse link channel (e.g., from the external device to the ICT 102) within coherence time and coherence bandwidth of the wireless channel. When the external device transmits data, the ICT 102 regards the signal as interference and estimates properties of the interfering signal, which could include an interference covariance matrix, the signaling format, the bandwidth of occupancy, receive power, fidelity of the receive signal, signal encryption, metric of sophistication of the signal (which could tell you something about the complexity of the device that generated the signal) to name several. As a consequence of reciprocity, the ICT 102 can use its interference covariance matrix estimate, bandwidth of occupancy, or other characteristics associated with the reciprocity of the channel to suppress interference to the external device (or to a receiver of transmissions from the external device) when transmitting to the receiver 106. It should be noted that an interference cognitive device, as used in this paper, may be "cognitive" of more than just interference, and that the device is referred to as interference cognitive due to the design goal of mitigating interference, rather than as a limitation regarding what factors of which the device is cognizant.

It is possible using the techniques described in this paper to demodulate the data, and potentially amplify it and "assist" the sender. It is also possible to infer information from the signal, such as if a data rate is going down then the channel between the external device and a receiver of the external device is likely to be bad or getting worse; you can also infer dynamics of the channel. If you can fully decode the signal you can tell a lot about the protocol of the external device.

During idle periods, the ICT 102 can detect interference from the external device (e.g., undesired signals). By reciprocity, the external device can also detect signals from the ICT 102. In operation, the ICT 102 waits until both itself and the receiver 106 are idle, then the ICT 102 uses its own receive chains to estimate interference covariance and estimation quality. By estimating the interference covariance at its own receive chains, the ICT 102 is able to measure the interference covariance from the external device to itself. By reciprocity, this interference covariance is equal to the interference covariance caused by the ICT 102 to the external device. Advantageously, the availability and quality of interference statistics enable the ICT 102 to adapt transmit precoding. The ICT 102 can use the estimates (and optionally their qualities) to compute a precoder for interference suppression to the external device at the ICT 102. The ICT 102 can compute optimal precoding using the effective channel matrix.

Optimality can be defined with respect to a selected performance objective subject to relevant constraints, such as to optimize video streaming. Examples of performance objectives for MIMO systems include by way of example but not limitation maximum interference level at an external device and maximizing the signal-to-interference-plus-noise ratio (SINR) of the weakest stream and equalizing the SINR for all streams. For MIMO-OFDM systems, performance objectives include by way of example but not limitation maximizing the minimum SINR across all spatial streams and active OFDM subcarriers, equalizing the SINR for all streams and active subcarriers, maximizing the geometric-mean SINR across active subcarriers of the weakest stream, and maximizing the exponential effective SNR mapping (EESM) of the weakest stream. Examples of constraints include by way of example but not limitation a per-antenna transmit power constraint, a total transmit power constraint summed across all antennae, an implementation complexity constraint, and a latency constraint.

Advantageously, the ICT 102 can act as a "good wireless neighbor" by suppressing interference to stations that the ICT 102 knows will treat a particular transmission as interference. It is expected that a wireless network that includes one or more ICTs will have reduced interference for each of the stations in the wireless network; the greater the proportion of ICTs to non-ICTs, the greater the expected reduction of noise for the stations in the wireless network.

In addition to interference covariance (or other values) that the ICT 102 detects using its own receive chains, the ICT 102 can receive interference covariance (or other values) feedback from the receiver 106. Advantageously, the availability and quality of CSI and interference statistics enable the ICT 102 to adapt transmit precoding with, presumably, even greater efficacy than if the ICT 102 only used its own receive chains. The ICT 102 can use the estimates (and optionally their qualities) to compute a precoder for interference suppression at the ICT 102. The ICT 102 can compute optimal precoding using the effective channel matrix. In this way, the ICT 102 can adapt to both interference at its own receive chains and to other interference introduced into the MIMO channel 110.

The ICT 102 can compute a matrix M using suitable design criterion and apply a noise-whitening matrix $M^{1/2}$ to channel estimates that are fed back from the receiver 106, if any. The modified channel estimates are used for transmit precoding to achieve interference suppression to the external device. Thus, the ICT 102 may be thought of as an interference-adaptive transmitter (IAT) that has the added capability to act as a good wireless neighbor to external devices that it detects using its own receive chains.

Figure 2:
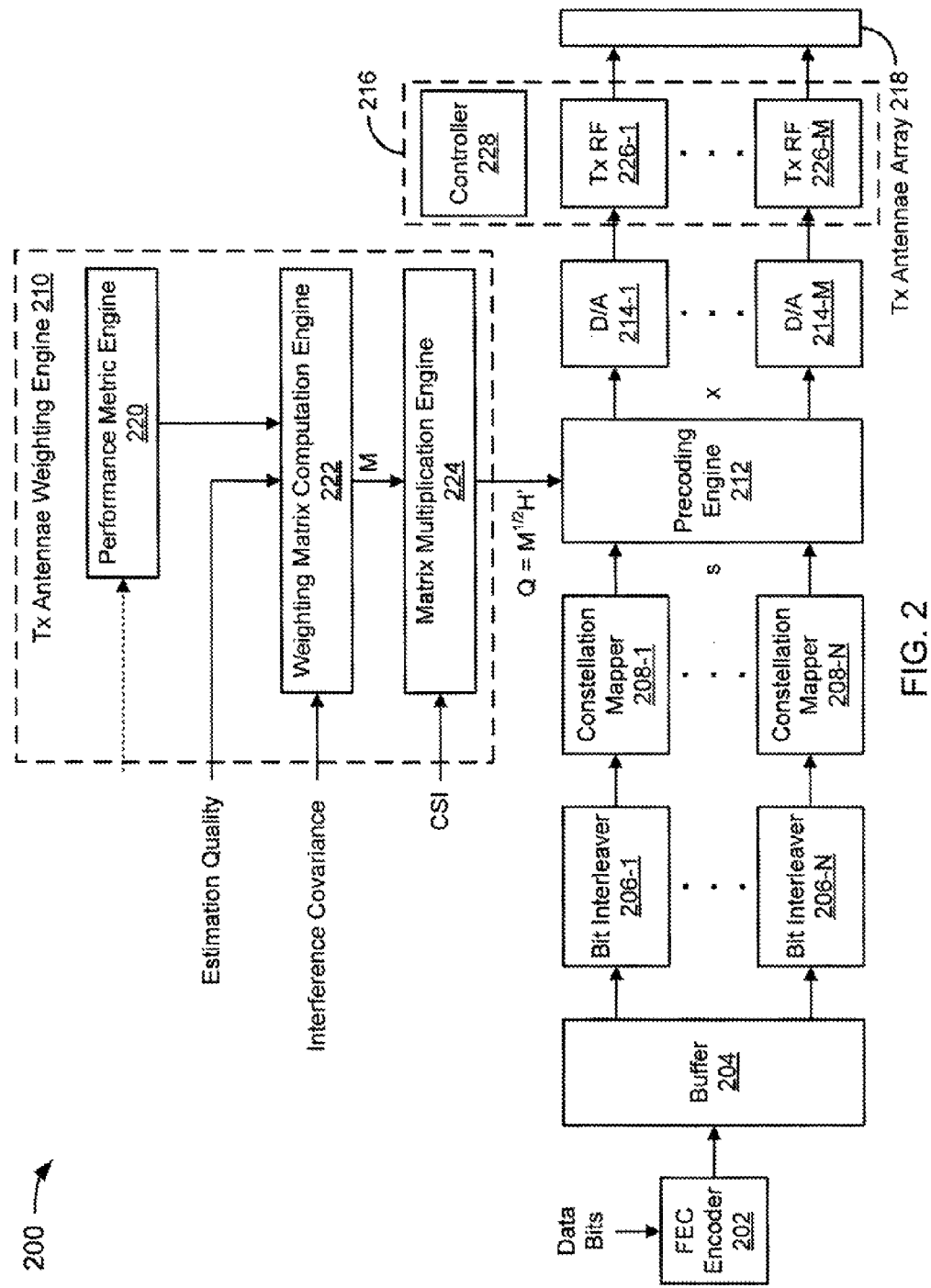
FIG. 2 depicts an example of a device suitable for use as a transmitter of an ICT.

FIG. 2 depicts an example of a device 200 suitable for use as a transmitter of the ICT 102 of FIG. 1. The device 200 includes a forward error correction (FEC) encoder 202, a buffer 204, bit interleavers 206-1 to 206-N (referred to collectively as bit interleavers 206), constellation mappers 208-1 to 208-N (referred to collectively as constellation mappers 208), a Tx antennae weighting engine 210, a precoding engine 212, digital-to-analog (D/A) converters 214-1 to 214-M (referred to collectively as D/A converters 214), a radio frequency (RF) module 216, and Tx antennae array 218.

In the example of FIG. 2, data bits are encoded at the FEC encoder 202. An FEC encoder is provided in this example because it is a typical device to encode bits in applications such as this. This component, and other components of the example of FIG. 2, could be replaced with alternative components that are capable of providing a signal associated with data bits to the Tx antennae array 218 for transmission onto a MIMO channel with appropriate weights.

In the example of FIG. 2, the coded bits are demultiplexed into $N_s$ independent spatial streams and stored in the buffer 204. It is conceivable that a system could be implemented in which the spatial streams are provided without storage in a buffer, or with a plurality of buffers.

In the example of FIG. 2, the spatial streams are bit-interleaved by the bit interleavers 208. The number of bit interleavers will typically correspond to the number of spatial streams, though it is conceivable that a system could have more (perhaps unused) or fewer (though this would be of dubious value using state of the art techniques) bit interleavers.

In the example of FIG. 2, the interleaved bits are mapped to constellation symbols (such as quadrature amplitude modulation) at the constellation mappers 208. The number of constellation mappers will typically correspond to the number of spatial streams, though it is conceivable that a system could have more (perhaps unused) or fewer constellation mappers. One can use fewer constellation mappers than spatial streams by multiplexing/switching so that one constellation mapper could service multiple streams. This saves space, cost, etc., as would be expected for reusing any piece of hardware. The constellation symbols are collected to form the $N_s \times 1$ constellation vector s.

In the example of FIG. 2, CSI and interference feedback from a receiver are provided to the Tx antennae weighting engine 210. In the example of FIG. 2, the Tx antennae weighting engine 210 includes a performance metric engine 220, a weighting matrix computation engine 222, and a matrix multiplication engine 224. The Tx antennae weighting engine 210 generates a $M_t \times N_s$ precoding matrix Q. In general, the precoding matrix Q may or may not use CSI fed back from receiver, if both CSI and an interference covariance matrix are available, an effective channel matrix can be computed as a noise-whitening matrix multiplied by the original channel matrix. The noise-whitening matrix may be, by way of example, the matrix square root of the inverse of the interference covariance matrix. If an interference covariance matrix is not available or if the quality of the covariance estimate is poor, the effective channel matrix can be the original channel matrix. It may be noted that the original channel matrix can be obtained from CSI.

In the example of FIG. 2, the performance metric engine 220 could receive raw data from which a performance metric is calculated. Preferably, the calculation would yield the same result as a corresponding calculation on a receiver. Alternatively, the performance metric engine 220 could receive a weighting matrix M as feedback from the receiver or through some other means, which would be provided (and passed through) the weighting matrix computation engine 222. Alternatively, the performance metric engine 220 could receive some other value that is useful in computing the weighting matrix M.

The computation of the weighting matrix engine 222 should account for optimal weights for the Tx-Fix link. So prior to performing calculations such as those described below with respect to the weighting matrix engine 222, the performance metric engine 220 can compute optimal weights for the Tx-Rx link, then check if the interference in the direction of the external device is below a given threshold. If so, the weights are calculated as described below for the weighting matrix computation engine 222. If not, the weights are modified to optimize the performance metric on the TX-RX path subject to the constraint of interference power in the direction of the external device. In this way, performing interference suppression in the direction of the external device is facilitated.

The weighting matrix computation engine 222 receives a performance metric from the performance metric engine 220, interference covariance from receive chains of the device 200 (not shown), and optionally estimation quality from the receive chains of the device 200. (Estimation quality is provided for robustly adaptive cognitive transmitter implementations.) These values are used to compute the weighting matrix M. Alternatively, the performance metric engine 220 could provide the weighting matrix M, obviating the need for some other receive chain measurements. The weighting matrix M can be computed in accordance with the following criteria.

Suppose the channel matrix for frequency-flat fading can be written as $H=H'+H\Delta$, where H' and $H\Delta$ are the channel estimate and estimation error, respectively. The error statistic $E[\text{vec}(H\Delta)\text{vec}(H\Delta)^H]=\sigma_H^2 I_{M_rM_t}$ is assumed to be known when channel estimation quality information is available. Here, vec(•) denotes the vectorization operation, $\sigma_H^2$ is the variance of the channel estimation error, and $I_{M_rM_t}$ is the $(M_rM_t) \times (M_rM_t)$ identity matrix. Sources of estimation error include limited estimation time finite preamble power, channel and interference time variation, finite precision samples, and RF circuit distortions.

Now let the true interference covariance matrix $R_{nn}$ be decomposed as follows:

$$R_{nn}=\hat{R}_{nn}+R_\Delta$$

where $R\Delta$ is an error matrix satisfying $R\Delta=R_\Delta^H$. Suppose the covariance matrix estimate is unbiased such that $E[R\Delta]=0$. Also, suppose that the estimate $R'_{nn}$ and the error statistic $\epsilon=E[R_\Delta^2]$ are known, which occurs when covariance estimation quality information is available. Define a $M_r \times M_r$ noise-whitening matrix (antennae weighting matrix) $M^{1/2}$ that is computed for interference suppression. A design criterion for the matrix $M=M^{1/2}(M^{1/2})^H$ is that the effective interference-plus-noise vector $n'=M^{1/2}n$ have a spatial covariance that is closest (in Frobenius norm) to the identity matrix. In other words, the resulting vector n' is nearly spatially "white." Under this criterion, the solution for M is $$M=(\hat{R}_{nn}^2+\epsilon)^{-1}\hat{R}_{nn}.$$

Another design criterion for M is to minimize the Frobenius norm of the covariance of the effective, interference-plus-noise vector n' subject to a minimum Frobenius norm constraint on $M^{1/2}$. With this criterion, the solution for M is:

$$M = \frac{K}{tr\left[\left(\hat{R}_{nn} + \epsilon\right)^{-1}\right]}\left(\hat{R}_{nn} + \epsilon\right)^{-1}$$

where tr(•) denotes the trace operator and K is the squared Frobenius norm constraint on $M^{1/2}$. Note that the equation provides a continuum of solutions depending on the quality of the interference covariance estimate. In particular, for a perfect covariance estimate (i.e., $R'=R_{nn}$ and $\epsilon=0_{M_r}$, where $0_{M_r}$ is the $M_r \times M_r$ matrix of all zeros), $M \alpha R_{nn}-1$. At the other extreme, when no covariance estimate is available (i.e., $R'_{nn}=I_{M_r}$), the error is spatially white (i.e., $\epsilon=\sigma_\epsilon^2 I_{M_r}$, where $\sigma_\epsilon^2 > 0$) and $M \alpha I_{M_r}$, which is equivalent to applying no noise-whitening matrix.

A third design criterion for M is to use a threshold on the covariance estimation error $\epsilon$. For instance, $$M = \begin{cases} g(\hat{R}_{nn}, \epsilon), & \|\epsilon\|_F^2 < \tau \\ I_{M_r}, & \text{otherwise} \end{cases}$$

where $g(R'_{nn}, \epsilon)$ is any suitable function of the interference covariance estimate $R'_{nn}$ and estimation error $\epsilon$, $\|\cdot\|_F$ denotes the Frohenious norm and $\tau$ is a programmable threshold. Such a threshold-based design criterion would include situations where the interference covariance estimate is available, although the quality of the estimate is poor. In such scenarios, the transmitter and/or receiver may decide to ignore the interference covariance estimate, in this example, the transmitter would ignore its interference covariance estimate by setting the threshold $\tau$ sufficiently low. Interference suppression would then occur only at the receiver. In this fashion, the interference suppression method adapts to the quality of the covariance estimate.

In the example of FIG. 2, the matrix multiplication engine 224 combines the weighting matrix M from the weighting matrix computation engine 222 and CSI from receive chains of the device 200 to generate a modified channel estimate, or precoding matrix Q. The CSI may include an "original" channel estimate H' or H' could be derived from the CSI. Q could be computed as $Q=M^{1/2}H'$. However, in an alternative, M and H' could be combined in some other manner to obtain Q.

In the example of FIG. 2, the constellation vector s and the precoding matrix Q are passed to the precoding engine 212. In this example, the precoding engine generates an $M_r \times 1$ transmitted vector x, where $x=Qs$. Alternatively, the constellation vector s and the precoding matrix Q could be combined in some other manner.

In the example of FIG. 2, the digital vector x is converted to analog waveforms at the D/A converters 214. The number of D/A converters 214 will typically correspond to the number of Tx antennae in the Tx antennae array 218, though it is conceivable that a system could have more or fewer D/A converters.

In the example of FIG. 2, the analog waveforms are upconverted to the desired carrier frequency at the RF module 216. The RF module 216 includes Tx radio frequency (RF) chains 226-1 to 226-M (referred to collectively as Tx RF chains 226) and a controller 228. The analog waveforms are provided through the Tx RF chains 226 (the number of Tx RF chains 226 will typically correspond to the number of Tx antennae in the Tx antennae array 218) to the Tx antennae array 218 for transmission. The Tx RF chains 226 are part of a circuit that includes the controller 228, which is capable of tuning to a desired carrier frequency.

Advantageously, the Tx antennae weighting engine 210 enables the precoding engine 212 to compute x in a manner that is cognitive with respect to external devices that are adding interference on a MIMO channel. In this way, the device 200 is capable of transmitting from the Tx antennae array 218 with reduced interference in the direction of the external device.

Figure 3:
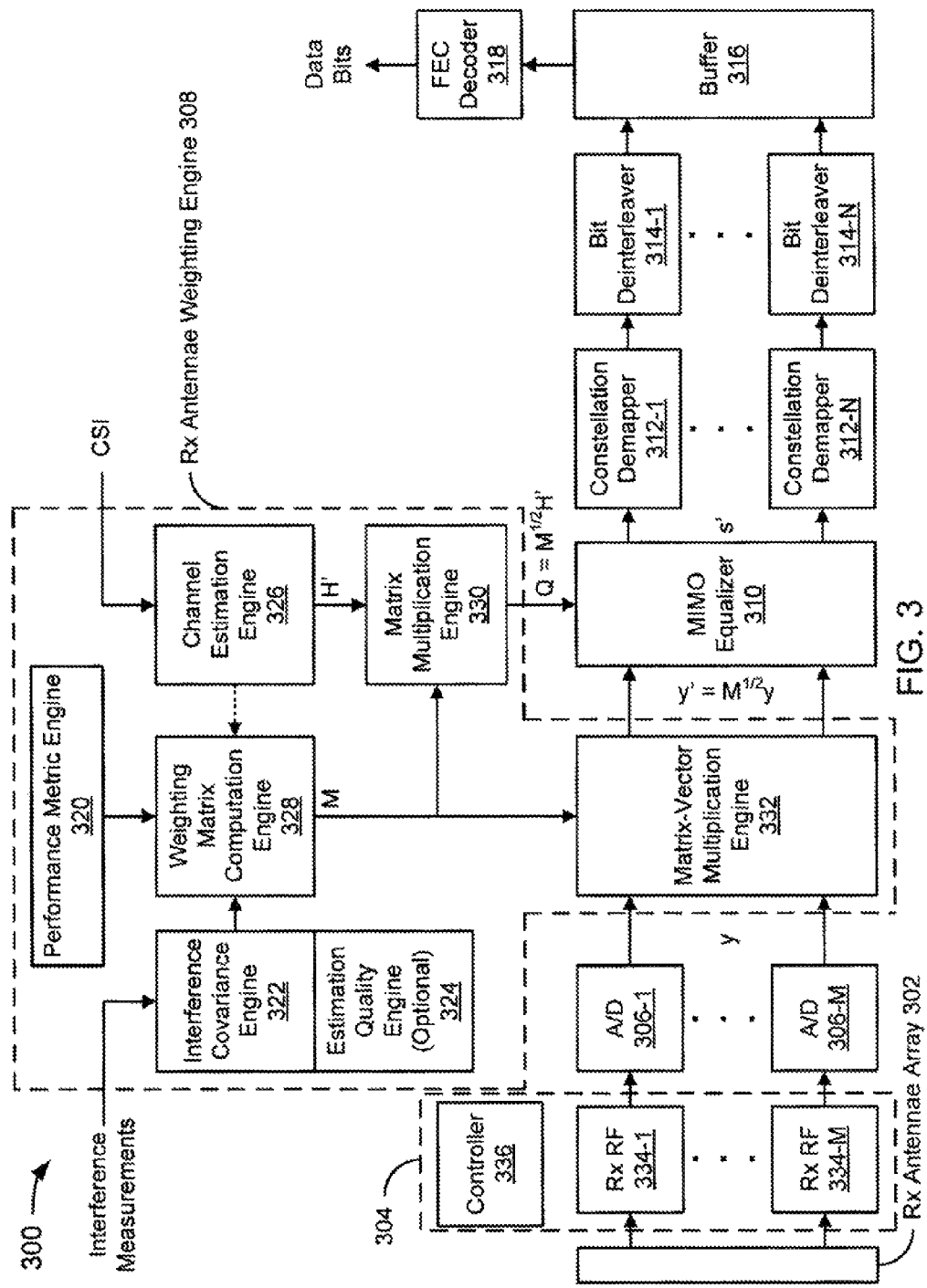
FIG. 3 depicts an example of a device suitable for use as an interference-cognitive device of an ICT.

FIG. 3 depicts an example of a device 300 suitable for use as an interference cognitive device of the ICT 102 of FIG. 1 or the receiver 106 of FIG. 1. The device 300 includes an Rx antennae array 302, an RF module 304, analog-to-digital (A/D) converters 306-1 to 306-M (referred to collectively as the A/D converters 306), an Rx antennae weighting engine 308, a MIMO equalizer 310, constellation demappers 312-1 to 312-N (referred to collectively as the constellation demappers 312), bit deinterleavers 314-1 to 314-N (referred to collectively as the bit deinterleavers 314), a buffer 316, and an FEC decoder 318.

It may be noted that the device 300 includes components that may or may not be implemented, but which are provided as an example. For example, the components of the Rx antennae weighting engine 308 are associated with the directionality of signals (e.g., interference covariance engine), but the device could make use of other signal characteristics instead. It may further be noted that the signal processing (from the MIMO equalizer 310 to the FEC decoder 318) could be simplified and/or replaced if the device 300 were acting as receive chains collocated with the transmit chains of an ICT, or if the device 300 were implemented as a more generalized cognitive device. However, a receiver (such as the receiver 106) will probably include sufficient components to receive on an antenna and derive data bits so the full receive chain is depicted (and the Rx antennae weighting engine 308 is provided as an example of one mechanism that can facilitate interference mitigation). See FIG. 5 for an example of a network of cognitive devices or FIG. 6 for a more general example of a cognitive device.

In the example of FIG. 3, signals are collected by the Rx antennae array 302, downconverted to baseband at the RF module 304. The RF module 304 includes Rx RF chains 334-1 to 334-M (referred to collectively as the Rx RF chains 334) and a controller 336. The Rx RF chains 334 are part of a circuit that includes the controller 336, which is capable of tuning to a desired carrier frequency.

In the example of FIG. 3, the analog baseband waveforms are digitized at the A/D converters 306 to produce an $M_r \times 1$ digital received vector y. For frequency-flat fading, y can be written as:

$$y = \gamma^{1/2} Hx + y_i + w$$

where $\gamma$ is the scalar power gain between the transmitter and the receiver, H is the $M_r \times M_t$ channel matrix normalized such that $E[|H|^2_{p,q}]=1$ ($1 \leq p \leq M_r$, $1 \leq q \leq M_t$), $y_i$ is a $M_r \times 1$ zero-mean interference vector and w is a $M_r \times 1$ zero-mean additive white Gaussian noise vector. Let $n=y_i+w$ denote the $M_r \times 1$ zero-mean interference-plus-noise vector, $E[\cdot]$ denote expectation, and the superscript $^H$ denote conjugate transpose. Define the $M_r \times M_r$ matrix $R_{nn}=E[nn^H]$. For brevity, $R_{nn}$ is called the "interference covariance matrix," rather than the "interference-plus-noise covariance matrix." The technology discussed here addresses MIMO interference suppression based on estimates of the interference covariance matrix.

In the example of FIG. 3, the A/D converters 306 provide vector y to the Rx antennae weighting engine 308. The Rx antennae weighting engine 308 also receives interference measurements and channel estimates.

In the example of FIG. 3, the Rx antennae weighting engine 308 includes a performance metric engine 320, an interference covariance engine 322, an estimation quality engine 324, a weighting matrix computation engine 326, a channel estimation engine 328, a matrix multiplication engine 330, and a matrix-vector multiplication engine 332.

The performance metric engine 320 includes a computer-readable storage medium that enables the computation and at least temporary storage of one or more performance metrics. It may be desirable to compute a performance metric multiple times. For example, the performance metric engine 320, depending upon the implementation or configuration could compute a performance metric for each of a plurality of carrier frequencies. When an optimal carrier frequency is found, the performance metric engine 320 may or may not discard the performance metrics associated with the other carrier frequencies. The output of the performance metric engine 320 is a performance metric.

The interference covariance engine 322 includes the optional estimation quality engine 324. By providing an estimation quality value, the estimation quality engine 324 can enable an associated receiver to operate in a robust manner. Thus, where the qualities of the estimates are computed, adaptive components can be referred to as "robustly adaptive." For the sake of brevity, the interference covariance engine 322 and the estimation quality engine 324 are referred to collectively as the interference covariance engine 322 instead of separately or as "an interference covariance and estimation quality engine." Interference measurements are provided to the interference covariance engine 322; the output of the interference covariance engine 322 is an interference covariance metric.

The channel estimation engine 326 receives CSI as input; the output of the channel estimation engine 326 is an "original" channel estimate H'. Channel estimates can be obtained, for example, during specified "preamble" sections of transmitted signals. These preambles can contain training sequences that enable the device 300 (or other devices) to estimate the channel matrix of a MIMO system. Interference is typically asynchronous with data symbol boundaries and may be caused by a variety of sources, such as by way of example but not limitation other wireless networks, garage door openers, and cordless telephones. Moreover, the interference can appear in bursts as a function of time. Because of these characteristics, it is often difficult to decode the interference. However, in some scenarios the interference statistics can be stationary within a certain time interval. Estimates of the interference statistics can improve transmit precoding and receiver processing in MIMO systems by concentrating useful signal energy towards the receiver while simultaneously attenuating the interference coming from the estimated directions. Interference statistics can be estimated during observation intervals (e.g., idle intervals) at which a device is neither receiving nor transmitting useful data. During these observation intervals, the received signals at each antenna are processed to obtain an estimate of the interference covariance matrix. Averaging over multiple observation intervals can be used to improve the quality of the estimates.

In wireless networks using random access protocols, such as wireless local area networks (WLANs) using carrier sense multiple access, interference mitigation for an automatic gain control (AGC) portion of a receiver is of significant interest. As stated above, covariance estimates can be obtained during idle intervals. However, strong interference can trigger the AGC to adjust the receive analog gain and start the receiver state machine. While the receiver is processing data (i.e., not during an idle interval), interference covariance estimates would not be obtained. Once the receiver determines that the AGC was triggered on interference rather than on a valid signal, the AGC and receiver state machine can be reset to the idle state. If the strong interference is still present, the AGC could trigger again. Repeated triggering of the AGC on interference reduces the throughput of the network. Furthermore, repeated AGC triggering may cause idle intervals not to occur at a sufficient rate to obtain reliable estimates of the interference statistics. In an embodiment, a method to avoid this situation is presented. First, the receiver determines quickly whether a valid packet is received. If it is determined that the AGC triggered on the interference, interference characterization would take place, rather than reselling the AGC and receiver immediately to the idle state. This interference characterization can include covariance matrix estimation. The AGC and receiver can then be reset after allowing sufficient time for estimating the interference covariance matrix. Using receiver feedback of these estimates, the transmitter can suppress the interference experienced by the receiver.

Interference could be caused by, by way of example but not limitation, other packet-based wireless networks or switching on and off a microwave oven. In such environments, the transmitter and/or receiver can always suppress the interference if the duty cycle of the interference exceeds a threshold. This interference suppression method provides robustness to intermittent interference. The duty cycle of the interference can be estimated, for instance, by collecting statistics of AGC trigger events caused by interference. The transmitter and/or receiver can estimate interference covariance matrix only when the interference is present (e.g., after the AGC has triggered on interference) such that spatial nulls are constantly placed in the directions of the intermittent interference.

An embodiment addresses the situation where the estimation error statistics are known for the channel and/or the interference covariance matrices. For instance, the estimation error of a stationary quantity (such as the channel or interference covariance matrix) is inversely proportional to the duration of the estimation interval. In this situation, the precoding and noise-whitening matrices can be modified to account for the quality of the estimates.

The weighting matrix computation engine 328 takes the performance metric from the performance metric engine 320 and the interference covariance metric from the interference covariance engine 322 and uses the input to compute a weighting matrix M. The weighting matrix M can be used to apply different weights to antennae according to different criteria. In some implementations, the weighting matrix computation engine 328 could make use of output from the channel estimation engine 326. The input to the weighting matrix computation engine 328 from the channel estimation engine 326 is depicted as a dotted line to represent that the input is optional.

The matrix multiplication engine 330 receives the weighting matrix M from the weighting matrix computation engine 328 and the original channel estimate H' from the channel estimation engine 326 and generates a modified channel estimate. In this example, $Q=M^{1/2}H'$. In an alternative embodiment, the matrix Q could combine M and H' in some other manner than matrix multiplication.

The matrix-vector multiplication engine 332 receives the vector y from the A/D converters 306 and M from the weighting matrix computation engine 328 and generates a weighted vector y'. $y'=M^{1/2}y$. In an alternative embodiment, the weighted vector y' could combine M and y in some other manner than matrix-vector multiplication.

In the example of FIG. 3, the MIMO equalizer 310 receives the weighted vector y' from the matrix-vector multiplication engine 332 and the matrix Q from the matrix multiplication engine 330. The MIMO equalizer 310 equalizes the weighted vector y' using the modified channel estimate represented by Q to form an $N_s \times 1$ equalized vector s'.

In the example of FIG. 3, the equalized vector s' passes through the constellation demappers 312 and at the bit-deinterleavers 314, the $N_s$ data streams are multiplexed into a single stream and put in the buffer 316, and data bits are obtained by the FEC decoder 318.

It should be noted that a station that is capable of transmitting and receiving (i.e., a transceiver) could include both a transmit chain (see FIG. 2) and a receive chain (as in FIG. 3). When a station receives feedback from a receiver that is not collocated, the data is referred to in this paper as "feedback" (e.g., interference covariance feedback or CSI feedback). However, when a station receives values from its own receive chains in, e.g., from idle period, the data is not referred to as "feedback" in this paper (e.g., interference covariance or CSI). The significance of this distinction is that an ICT need not receive "feedback" from a receiver in association with a transmission from its own transmit antennae. However, an ICT can use its receive chain to learn about an external device; so it can also receive values from its own receive chain. Therefore, the most general case for an ICT is to receive, e.g., interference covariance, and a subset of such data is to receive, e.g., interference covariance feedback (if the ICT also receives feedback from a receiver). When the ICT is a "good neighbor" IAT, the ICT can receive both interference covariance from its own receive chains and interference covariance feedback from a receiver. An IAT that is not an ICT, on the other hand, only receives feedback from a receiver.

It may be desirable to use fewer of the components illustrated in FIG. 3 for the purpose of analyzing interference from an external device. The benefits of using fewer of the components would be a reduction in the amount of resources used to process the interference. However, less information might be derived by using a smaller set of components.

In any case, it should be noted that receive chains can be different e.g., include different components, include more or less of a particular component, etc.) if an external device is sending a signal that is different than that associated with the device 300's standard receive chain (or one of its standard receive chains). So the device 300 may include different or different numbers of components in various receive chains, some of which are "incomplete" in the sense that the receive chain cannot process a signal from receipt on one or more antennae to deciphering the payload.

In a system where collocated receivers are used, the system may or may not use the entire receive chain illustrated in FIG. 3. Interference from an external device will have a specific structure, rather than simply pseudo-random noise. So the system can use the components of the receive chain to derive information as if the interference were treated as a signal carrying data. If the interference is processed completely, then the structure of the interference can be analyzed and avoided by using a modulation format that is less prone to interfere with the external device. For example, it may be the case that you could use frequency modulation to avoid interfering with an external device that is transmitting or receiving signals having some certain structure.

In a band that includes both primary and secondary users, it may be desirable for a secondary user to overhear the primary user, and to use the band under certain constraints. For example, the station associated with a secondary user can be configured to overhear what parts of the spectrum are occupied and utilize identified holes. A secondary user may not be able to transmit using a primary user protocol, but may or may not still want to be able to process a signal sent using the primary user protocol for the purpose of mitigating interference, improving performance, reducing power consumption, or for other reasons.

Figure 4:
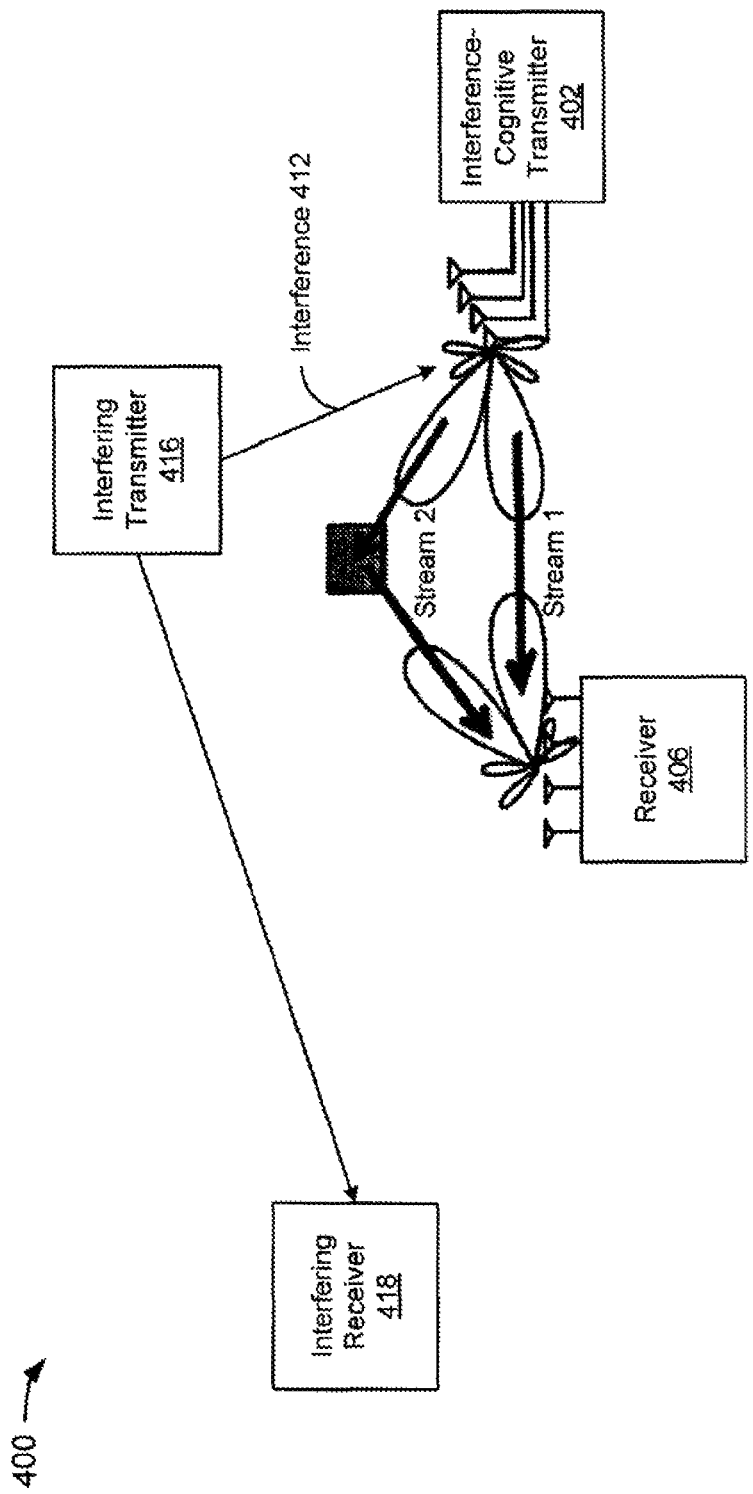
FIG. 4 depicts a conceptual diagram of spatial geometry of a system that has an ICT.

FIG. 4 depicts a conceptual diagram of spatial geometry of a system 400 that has an ICT. This example is intended to illustrate that a transmitter can suppress interference to unintended recipients of transmitted signals (such as a device that is responsible for some of the interference on a channel) in a system such as is illustrated in the example of FIG. 1. FIG. 4 illustrates how the directionality of transmissions in a MIMO system can be used to suppress interference. Techniques other than directionality are discussed later. The system 400 includes an ICT 402 and a receiver 406.

As is shown in the example of FIG. 4, the ICT 402 directs one or more streams in a geometric pattern. In the example of FIG. 4, there are two streams, stream 1 and stream 2. The streams may or may not be formed using CSI and interference covariance. Where CSI and interference covariance are available, the values may come from the ICT 402's own receive chains or as feedback from the receiver 406. The streams can be characterized as avoiding or going around the interference 412. This is accomplished using precoding and/or other techniques described in this paper. The receiver 406 directs one or more spatial streams in a geometric pattern, as well. It should be noted that the interference at the receiver 406 will not be the same interference 412, but rather a different interference (not shown). It is likely that the ITC 402 will need to the interference covariance matrix (at least with respect to directionality) at the receiver 406 in order to suppress interference from the interfering transmitter 416 to the receiver 406.

In the example of FIG. 4, for illustrative purposes, it is assumed that the interference 412 is caused by an interfering transmitter 416 when the interfering transmitter 416 transmits to an interfering receiver 418. The interfering transmitter 416 can be, by way of example but not limitation, a wireless device on a different network. A principle of channel reciprocity is that the forward link channel (e.g., from the ICT 402 to the interfering transmitter 416) is approximately equal to the reverse link channel (e.g., from the interfering transmitter 416 to the ICT 402) within coherence time and coherence bandwidth of the wireless channel. When the interfering transmitter 416 transmits data, ICT 402 regards the signal as interference and estimates the interference covariance matrix. As a consequence of reciprocity, the ICT 402 can use its interference covariance matrix estimate to suppress interference to the interfering transmitter 416 when transmitting to the receiver 406.

Advantageously, during idle periods, the ICT 402 can detect interference from the interfering transmitter 416. By reciprocity, the interfering transmitter 416 can also detect signals from the ICT 402. In operation, the ICT 402 waits until both itself and the receiver 406 are idle, then the ICT 402 uses its own receive chains to estimate interference covariance and estimation quality. By estimating the interference covariance at its own receive chains, the ICT 402 is able to measure the interference covariance from the interfering transmitter 416 to itself. By reciprocity, this interference covariance is equal to the interference covariance caused by the ICT 402 to the interfering transmitter 416. The ICT 402 computes the matrix M using suitable design criterion and applies the noise-whitening matrix $M^{1/2}$ to the channel estimates that are fed back from the receiver 406. These modified channel estimates are used for transmit precoding to achieve interference suppression to the interfering transmitter 416.

It should be noted that interference covariance is used in this example because of the relative ease with which directionality can be illustrated in the example of FIG. 4. However, other parameters (other than those associated with directionality) can be used. If used in conjunction with directionality, then performance metrics may be such that a partial null in a particular direction (e.g., toward an interfering receiver), plus reduced power, might adequately meet needs instead of using a null (e.g., toward the interfering receiver). In general, the more information that is available, the more refined or creative solutions to mitigate interference can be.

It should be noted that although detecting interference during an idle period is assumed, there are reasons why the ICT 402 would want to use some antennae for receiving while using others for transmitting. For example, receive antennae consume less power than transmit antennae, all antennae are not needed for carrier sense, and receive antennae cause less interference to collocated and other components than transmit antennae.

In an alternative embodiment that does not include an IAR, the geometry of a receiver of the streams may have a less optimal shape (e.g., the pattern could be generally circular around the receiver 406). The ICT 402 could still presumably compensate for the interference, though probably with less effectiveness than a system that includes both IAR and ICT.

In an alternative embodiment that does not include a "good neighbor" IAT, the geometry of a transmitter of the streams may have a less optimal shape (e.g., the pattern could be generally circular around the ICT 402). However, since the ICT 402 is aware of the interfering transmitter 416 that causes at least some of the interference 412, the streams will still presumably be directed around the interference 412 to at least some extent. The receiver 406 could still presumably compensate for the interference 412 (or those parts of the interference 412 for which the ICT 402 does not compensate through the use of its own receive chains), though probably with less effectiveness than a system that includes both IAR and a "good neighbor" IAT.

It may be noted that the mitigation of interference is for the benefit of the interfering receiver 418. In embodiments that enable the ICT 402 to learn about characteristics of transmissions to the interfering receiver 418, or perhaps even the location of the interfering receiver 418, mitigation of interference to the interfering receiver 418 might be further improved. Also, what the ICT 402 learns about the interfering transmitter 416 may or may not enable the ICT 402 to mitigate interference to the interfering transmitter 416 when the interfering transmitter 416 is acting as a receiver, (The latter example requires that the interfering transmitter 416 include a receiver.)

Figure 5:
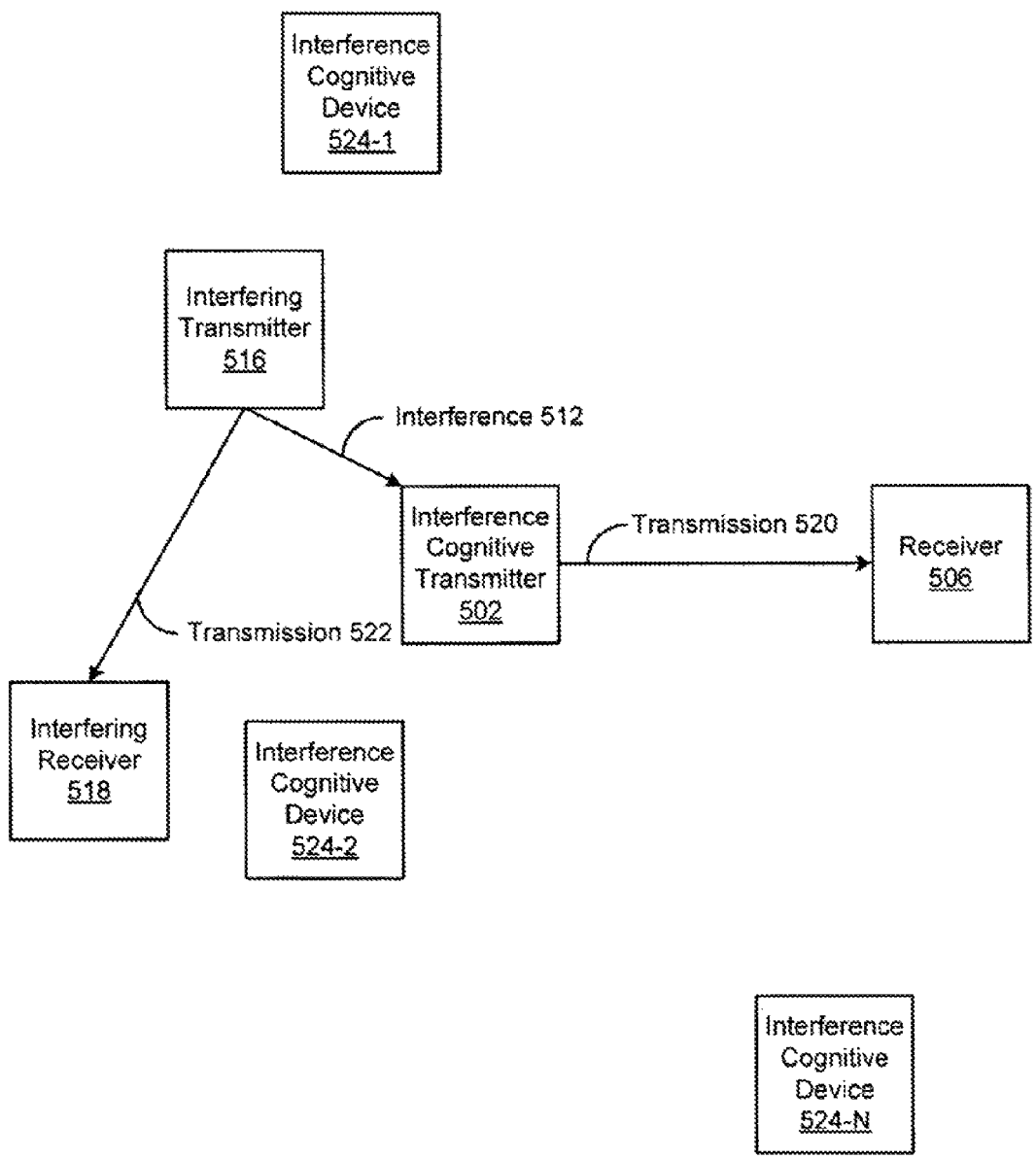
FIG. 5 depicts an example of a system with networked cognitive devices.

FIG. 5 depicts an example of a system 500 with networked interference cognitive devices. The system 500 includes an ICT 502, a receiver 506, an interfering transmitter 516, and an interfering receiver 518. The system 500 may also include interference cognitive devices 524-1 to 524-N (collectively, the interfering cognitive devices 524), as is discussed later.

The ICT 502 can be implemented as a transmitter that includes a collocated receiver chain that can provide data useful for mitigating interference. One example of a transmitter that can be included in the ICT 502 is described with reference to FIG. 2. The example of FIG. 2 is primarily associated with interference mitigation by considering the directionality of transmissions using interference covariance data and, optionally, CSI and/or estimation quality. Generally, a performance metric will be desirable in any case, since requirements, desirable parameters, and acceptable tradeoffs are needed to meaningfully address characteristics of a channel, signal, transmitter, receiver, or other factors. Also, the techniques apply to both MIMO and degenerate cases of MIMO, including SISO, making some of the components of FIG. 2 optional or unnecessary for that additional reason. In addition, as was indicated with reference to FIG. 2, the figure is an example, and any applicable known or convenient technology that enables transmission with interference mitigation could reasonably be used, which may or may not use the illustrated components.

One example of a receiver that can be included in the ICT 502 is described with reference to FIG. 3. As with FIG. 2, the example of FIG. 3 is primarily associated with interference mitigation by considering the directionality of transmissions. Generally, a performance metric will be desirable. Also, the techniques apply to both WAD and degenerate cases of MIMO, including SISO, making some of the components of FIG. 3 optional or unnecessary for that additional reason. In addition, as was indicated with reference to FIG. 3, the figure is an example, and any applicable known or convenient technology that enables signal processing for interference mitigation could reasonably be used, which may or may not use the illustrated components.

Since the ICT 502 is actually a transmitter (by definition, since the "T" in ICT stands for "transmitter"), it can reasonably include a fully functional transmit chain to enable it to fulfill its transmitter role. In addition, the ICT 502 may or may not also include a fully functional receive chain, such as is illustrated by way of example in FIG. 3. While it will often be the case that a station in a wireless network will be capable of transmitting and receiving, it is not, strictly speaking, a requirement. Moreover, the ICT 502 can include a fully functional receive chain for wireless communications in a particular wireless network (e.g., IEEE 802.11b/g standards-compliant), but only a portion of a receive chain for one or more other wireless networks (e.g., Bluetooth). This can enable the station to transceive in a particular wireless network and derive useful information from interference associated with some other network on which the transceiver does not transmit. Depending upon the amount of information that is to be derived from a particular interference 512, a receive chain can omit portions of a receive chain (e.g., an equalizer, demappers, FEC decoder, etc.) and still derive information from the interference 512 (e.g., power, signal format, directionality, etc.). Examples of other information that can be derived are provided later with reference to FIG. 6.

In the example of FIG. 5, the ICT 502 can be implemented as a transmitter that utilizes known or convenient technology, and gains interference cognitive data from the interference cognitive devices 524. In such an implementation, the ICT 502 can be referred to as interference cognitive, despite the lack of collocated interference cognitive components, by utilizing information or instructions from interference cognitive devices. Some advantages of using relatively remote (where "relatively remote" means within wireless range, but not collocated) interference cognitive devices is that the interference cognitive devices can have greater knowledge about the overall network. Indeed, the knowledge could be shared with and centralized at an access point (AP)—and the ICT 502 may or may not be an AP—or an AP controller, or in a server. The ICT 502 can also be implemented to utilize both the interference cognitive devices 524 and a collocated receiver chain.

In the example of FIG. 5, in operation, the ICT 502 detects the interference 512. The ICT 502 may or may not be capable of full-duplex transmission (i.e., simultaneous send and receive), in which case the ICT 502 would not need to wait for an idle period. However, it has been difficult to develop wireless stations that are capable of full-duplex on a single band due to practical problems, though if the practical problems of full-duplex are solved for radios, the techniques described in this paper should be applicable to a system capable of full-duplex. Other options for obtaining data from the interference 512 include detecting the interference 512 during an idle period, detecting the interference 512 during half-duplex reception, detecting the interference 512 during simultaneous reception on a different band, or detecting the interference 512 in some other manner. The interference 512 can be detected directly on the ICT's receive chain, or indirectly on one or more of the interference cognitive devices 524, which provide relevant data to the ICT 502.

When the ICT 502 sends a transmission 520 to the receiver 506, the ICT 502 can attempt to mitigate interference to the interfering receiver 518 when the interference transmitter 516 sends the transmission 522. For the purposes of this example, the transmission 520 and the transmission 522 are contemporaneous, though the ICT 502 will not necessarily know if the interfering receiver 518 is actually receiving a transmission at the time the transmission 520 is sent. Typically, the ICT 502 will attempt to mitigate potential interference for devices of which it is cognizant, though whether it actually knows or is mistaken will depend upon the sophistication of the components, the possibility that a station will move out of range or stop transmitting or receiving, and/or other factors.

In an alternative, the ICT 502 can attempt to mitigate interference to the interfering transmitter 516 when the interfering transmitter 516 is receiving. Although it is not illustrated in the example of FIG. 5, this example could be illustrated by changing the direction of the arrow illustrative of the transmission 522 to point from the interfering receiver 518 to the interfering transmitter 516. Obviously, if the interfering transmitter 516 is able to receive, it includes a receiver; and if the interfering receiver 518 is able to transmit, it includes a transmitter. In yet another alternative, the ICT 502 can attempt to mitigate interference as illustrated in FIG. 5, and also mitigate interference to the interfering transmitter 516 when the interfering transmitter 516 is receiving.

The interference cognitive devices 524 can be implemented as stations on a wireless network. It should be noted that the interference cognitive devices 524 need not have transmitters; they could instead have only receivers for monitoring a network, and provide data associated with the monitoring through a wired backbone to the ICT 502 (or to other devices, a server, etc.). It is expected, however, that the interference cognitive devices 524 are likely to be implemented as stations, such as APs or non-AP stations, that are capable of both transmission and reception.

It should be noted that the interference cognitive devices 524, if they are in range, will receive the interference 512. Indeed, if the ICT 502 is implemented using an applicable known or convenient technology, the interference 512 might only be detected by the interference cognitive devices 524 that are within range of the interfering transmitter 516 (and not by the ICT 502).

In an alternative, the interfering transmitter 516 could send data through a wired backbone regarding its transmissions. This data could be provided (or processed to produce information that is provided) to the ICT 502. Similarly, a device on the wired backbone could know some data about the interfering transmitter 516 that would enable to the ICT 502 to be cognizant of characteristics of its transmissions. For example, if the interfering transmitter 516 is associated with a managed account, data from the account might be useful to the ICT 502.

Where it is desirable to draw a distinction between an ICT that uses its own receive chain to obtain data and an ICT that is provided data, either from other interference cognitive devices or from a controller or server, the former can be referred to as an "active" interference cognitive device, and the latter can be referred to as a "passive" interference cognitive device. A network that includes one or more interference cognitive devices can be referred to as an interference cognitive network.

In an interference cognitive network, it may be possible to detect "cheaters" who are not behaving in a manner that is ideal for overall system performance. For example, it may be that game theory is used to determine performance metrics for various devices that improve performance for all stations in the network if the performance metrics are observed, or performance metrics could be regulated, or could be optimal for certain devices (to the detriment of others). One example of this is power. If a device increases power, it will likely have better performance. If all devices on a network increase power, it could easily be sub-optimal for all devices. Once appropriate performance metrics are known, deviations from such performance metrics can be detected by interference cognitive devices, and countermeasures performed (if desired), such as jamming, reporting, relaxing constraints in relation to the cheating device, or other actions. What is meant by relaxing constraints is if a device is misbehaving, other devices need not attempt to mitigate interference to that device, but will continue to attempt to mitigate interference to devices that are following the rules.

Figure 6:
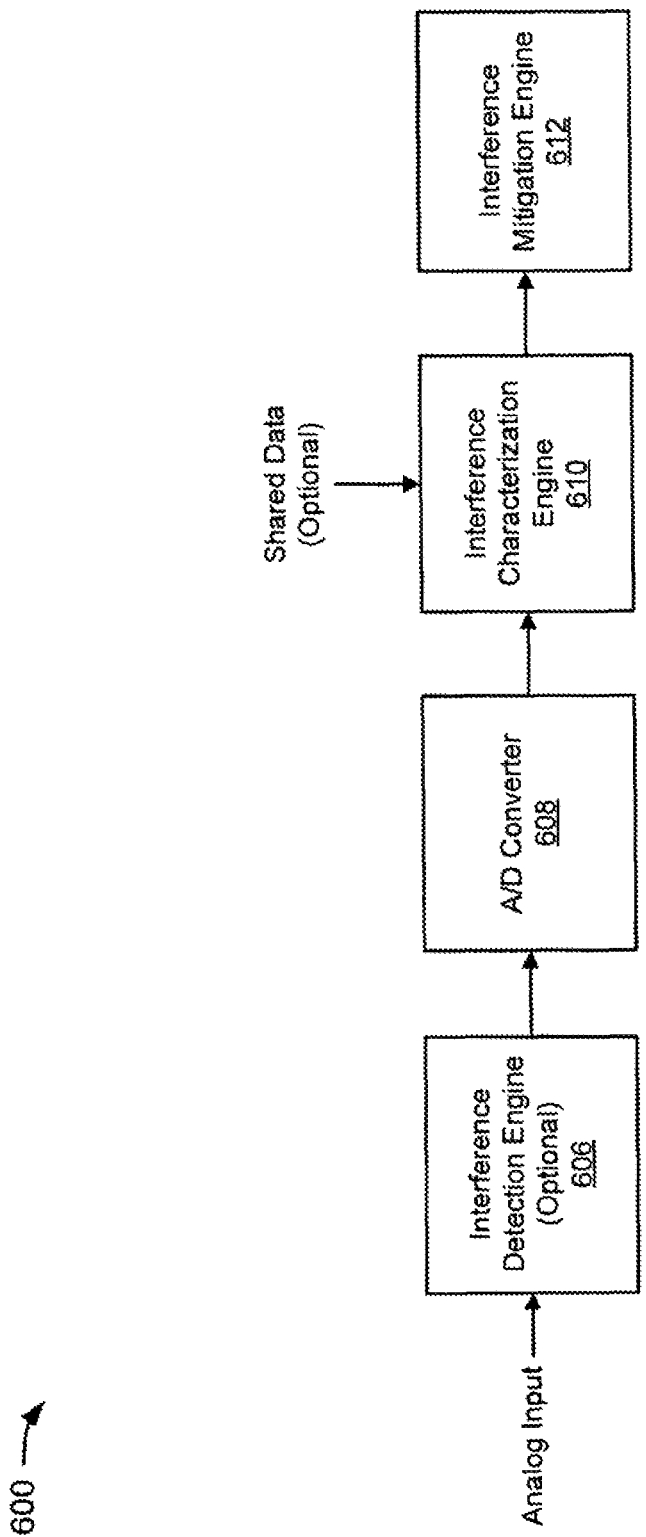
FIG. 6 depicts an example of a device suitable for use as a cognitive device.

FIG. 6 depicts an example of a device 600 suitable for use as an interference cognitive device. The device 600 includes an optional interference detection engine 606, an A/D converter 608, an interference characterization engine 610, and an interference mitigation engine 612.

It should be noted that an interference cognitive device can be implemented with or without receive antennae. If the interference cognitive device is a typical station in a wireless network (e.g., a smart phone, laptop, etc.), it will likely include a receive antenna coupled to the A/D converter 608 (through other hardware components, and optionally through the interference detection engine 606). However, an interference cognitive device could also receive shared data from other devices that have receivers, which would make it theoretically possible for an interference cognitive device to have no receive antennae. While this may appear at first glance to be suboptimal, it should be noted that if a cognitive device is not idle for a period of time, at least for that period of time the device 600 acts as if it has no receive chains (or at least no receive chains that can be used to process interfering signals). So the proposition that the device 600 optionally does not include receive antennae related to the actual situation in which the device 600 cannot use its receive chains to process interfering signals.

The optional interference detection engine 606 is optional because it is not necessary for a cognitive device to derive performance-related data from an analog signal. However, it is possible to perform analysis of a signal at this stage. For example, the power of an analog signal could provide relevant data, or bandwidth of occupancy, or the frequency of the signal, to name a few examples. Most analog circuits are "power-aware," making power detection a relatively straightforward problem to solve (strong signals are typically from relatively close transmitters, and if this data is combined with other signal format knowledge, the distance of the transmitter can be even more accurately determined). Bandwidth of occupancy can be accomplished by implementing a wideband filter. Wideband filters are theoretically optimal, but narrowband filters are frequently employed. If using narrowband filters, a band can still be parsed. Although a transmitter will generally only look in a band in which it intends to transmit, an agile transmitter might want to scan multiple narrow bands.

The analog signal is converted to digital at the A/D converter 608. The distinction between the optional interference detection engine 606 and the interference characterization engine 610 is that the former is in the analog domain and the latter is in the digital domain. In general, however, where the distinction is not particularly important the two engines could be referred to as an interference characterization engine that is capable of both detection and characterization (or just detection, which in and of itself is a form of characterization), and that is capable of both analog- and digital-domain (or one or the other domain) analysis of signal properties. Alternatively, the interference detection engine 606 could be referred to as an analog-domain interference characterization engine, and the interference characterization engine 610 could be referred to as a digital-domain interference characterization engine. The domain in which the analysis occurs is significant from a hardware perspective and from the perspective of what data is being derived from a signal, but conceptually both of the engines could properly be referred to as a (single) interference characterization engine.

At the interference characterization engine 610, in the digital domain, there is a lot of data that can be derived from a signal, the amount of data which will depend upon the implementation, technical, environmental, and perhaps other constraints. Examples of data that can be derived include, in general, data that can be derived at the optional interference detection engine 606 (e.g., power, bandwidth of occupancy, etc.), plus additional data, such as interference covariance (directionality), signaling format, fidelity of the receive signal, signal encryption, metric of sophistication of the signal (which could tell you something about the complexity of the device that generated the signal) to name several. The example of FIG. 3 illustrates a receiver that is capable of deriving directionality data from signals (using, e.g., an interference covariance engine). Alternatively, modulators could be used to determine, for example, signaling format. Essentially, using the modulators, the interference characterization engine 610 could determine whether a signal matches a certain pattern that is characteristic of, e.g., Bluetooth, a baby monitor, etc. If a signal looks like a certain pattern, that can provide useful information, such as whether the signal will be robust against narrowband interference (as is the case for Bluetooth). If a signal is robust against narrowband interference, then a good neighbor device will not feel as concerned about inserting a narrowband signal in the direction of the, e.g., Bluetooth device.

Not all of the data needs to be derived from interfering signals. For example, data could be obtained by interrogating a station in a wireless network through, for example, an AP, and that data shared with cognitive devices. However, for cognitive devices that are not privy to some centralized controller that has such information, the data will generally be derived from interfering signals. It is also possible to have distributed network data sharing in, e.g., an ad hoc network. In such a case, cognitive devices may share data with one another to improve the probability of effective interference mitigation, performance metric establishment, or the like.

Data provided from a centralized controller, distributed source, other cognitive devices, or other sources can be referred to as shared data, which is optional. For illustrative purposes, this data flows through the interference characterization engine 610 of the device 600, though conceptually the interference characterization engine 610 could be considered a distributed system that includes, e.g., multiple different cognitive devices, a centralized controller, etc. So it makes sense to refer to a "centralized" interference characterization engine, or a "distributed" interference characterization engine, as well as a "local" interference characterization engine. For illustrative purposes in this paper, the interference characterization engine 610 is considered to be local because it is "on" the device 600. Where a more expansive meaning is intended, the engine will be referred to as "distributed," and where specific reference is intended to a centralized controller or server, the engine will be referred to as "centralized."

The interference characterization engine 610 can include components that extend all the way through a receive chain to the point where data bits (payload) are decoded. Or the interference characterization engine 610 could include an "abbreviated" receive chain that has fewer than the necessary components to decode data bits from an interfering signal. It is also possible for a receive chain to be fully capable of decoding data bits, but when receiving an interfering signal, the signal does not get fully processed. There are reasons for various different implementations, including reduced component costs, implementation preferences not to, e.g., decode data bits of signals that were inadvertently received, reduced power consumption, etc.

Once data about an interfering signal is known (or guessed or estimated), it can be passed to the interference mitigation engine 612, which provides data to a transmitter, prepares a signal for transmission, and/or transmits the signal. In the example of FIG. 2, estimation quality, interference covariance, and CSI are provided as input to the Tx antennae weighting engine 210. The example of FIG. 2 is directed to an example that considers directionality. Examples that utilize other data, such as signal format, will receive different parameters. Also, inputs might be provided in the analog domain instead of the digital domain. In general, the interference mitigation engine 612 can include any amount of signal processing. Such signal processing may require the use of filters (e.g., for power analysis), demappers (e.g., for signal format analysis), demodulators (e.g., for data stream analysis), or the like. Persons of skill in the relevant art with this paper before them would understand that certain hardware components are needed to accomplish certain tasks, and different components could be substituted to accomplish the same or related tasks.

Figure 7:
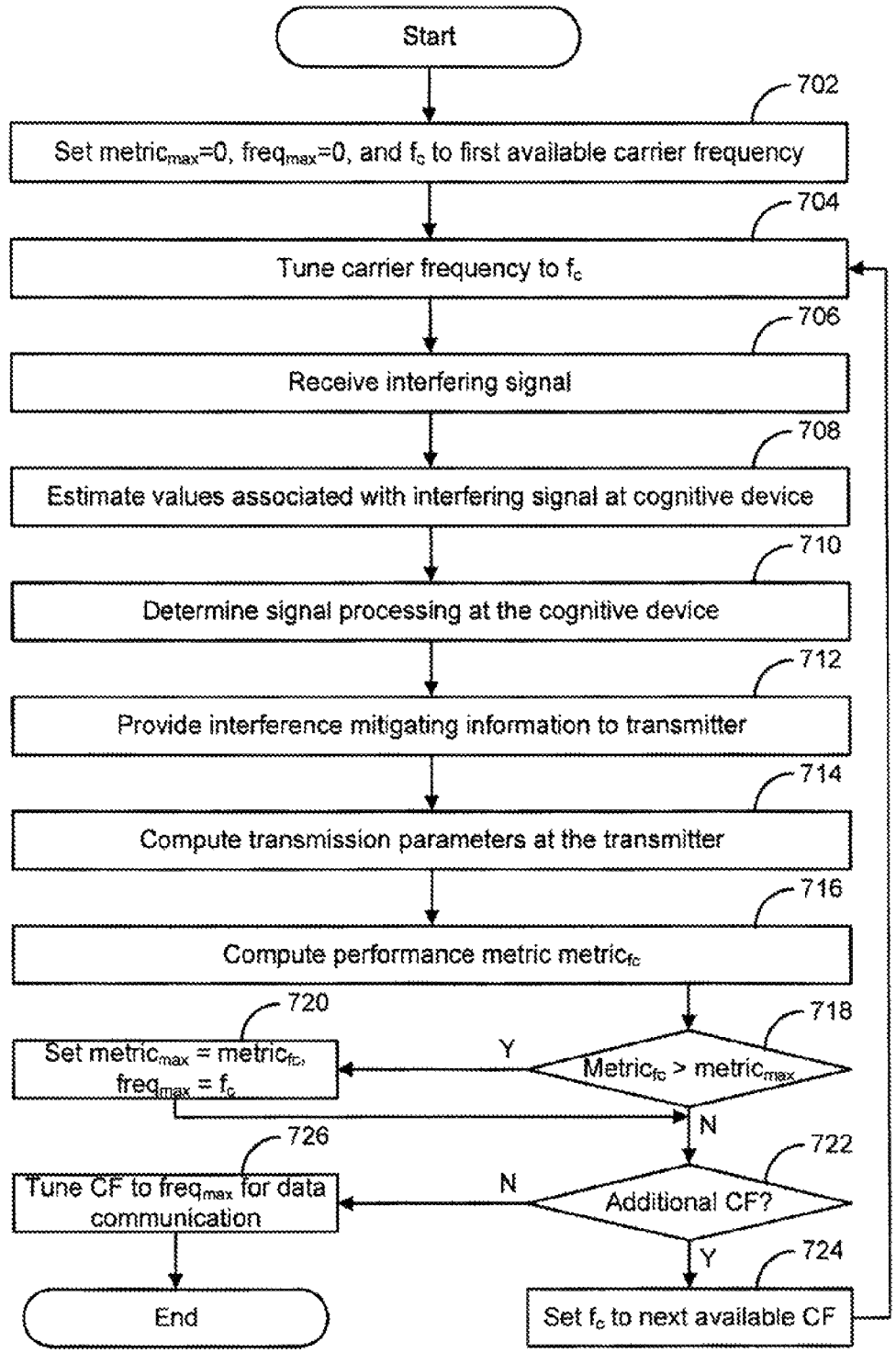
FIG. 7 depicts a flowchart of an example of a method for channel selection in a system including an ICT.

FIG. 7 depicts a flowchart 700 of an example of a method for channel selection in a system including an ICT. The method could be used with a system similar to that depicted by way of example in FIG. 1. The ICT can include a collocated transmit and receive chain, where the receive chain is used to process an interfering signal, or the ICT could include a transmit chain and the receive chain could be implemented on a remote or relatively remote cognitive device. This method and other methods are depicted as serially arranged modules. However, modules of the methods may be reordered, or arranged for parallel execution as appropriate. This and other methods described in this paper can be implemented on machines such as those described by way of example with reference to FIGS. 1-6.

In the example of FIG. 7, the flowchart 700 starts at module 702 with setting $metric_{max}=0$, $freq_{max}=0$, and $f_c$ to a first available carrier frequency. The variable $metric_{max}$ is intended to represent a performance metric associated with a carrier frequency $f_c$. Preferably, when the flowchart 700 ends, $metric_{max}$ will be set to the highest performance metric over all available carrier frequencies. In this example, it is assumed that a performance metric of practically any carrier frequency will be higher than the initial value of 0, and that the higher the performance metric, the better. Of course, the variable could be used in other ways (e.g., using negative numbers and/or an initial value that is other than 0). In such a case, this initial value can be thought of as the offset value of an initial non-zero value.

The variable $freq_{max}$ is intended to represent a frequency that corresponds to the carrier frequency associated with the performance metric to which $metric_{max}$ is set. Thus, if $metric_{max}$ changes to a new, higher value, $freq_{max}$ also changes to the current carrier frequency value. Preferably, when the flowchart 700 ends, freq$_{max}$ will be set to the carrier frequency having the highest performance metric of all available carrier frequencies. The actual value of freq$_{max}$ could be a whole number representative of one of an array of carrier frequencies, a real number representative of the frequency in, e.g., MHz, or some other value that enables correlation of the freq$_{max}$ value to a carrier frequency. The initial value of 0 is intended to represent no carrier frequency association, though the freq$_{max}$ value could be initially set to $f_c$ (which would later have its performance metric calculated and stored in the metric$_c$ variable) or some other value that can be offset to be representative of none or one of the possible carrier frequencies. The variable $f_c$ is intended to represent a frequency or channel that is being (or will next be) evaluated. When a new metric, is set, freq$_{max}$ can be set to $f_c$.

In the example of FIG. 7, the flowchart 700 continues to module 704 with tuning carrier frequency to $f_c$.

In the example of FIG. 7, the flowchart 700 continues to module 706 with receiving an interfering signal. For the purposes of illustration, the interfering signal is assumed to be more than just noise. The assumption can be made because it is a design goal to reduce interference for receivers of the interfering signal (or for the interfering transmitter when receiving other signals), it is not necessary to modify performance or signal characteristics if the interfering signal is just noise.

In the example of FIG. 7, the flowchart 700 continues to optional module 708 with estimating values associated with interfering signal at cognitive device. Estimates can be made from the interfering signal, from the channel on which the signal is received, from a controller that has some data associated with the interfering signal or a transmitter of the interfering signal, or the like.

In the example of FIG. 7, the flowchart 700 continues to module 710 with determining signal processing at the receiver. The receiver can use the information about the channel, the interfering signal, the interfering transmitter, or the like to determine signal processing for interference suppression. This can include a determination regarding the appropriate power of a transmission, the directionality of a transmission, or the like.

In the example of FIG. 7, the flowchart 700 continues to module 712 with providing interference mitigating information to a transmitter. The interference mitigating information can include channel, interference covariance, power constraints, and optionally their qualities. A goal is to reduce interference to other devices, while maintaining operation within parameters identified by performance metrics. Thus, any information that meets this goal could be provided to the transmitter.

In the example of FIG. 7, the flowchart 700 continues to module 714 with computing transmission parameters at the transmitter. The transmitter uses the interference mitigating information to determine a precoding matrix, power constraints, or the like for use in interference suppression.

In the example of FIG. 7, the flowchart 700 continues to module 716 with computing a performance metric metric$_{ic}$. The transmitter can compute the performance metric for the current carrier frequency $f_c$. Examples of performance metrics include minimum SINR across data streams, geometric-mean SINR across data streams, and bit error rate (BER) of the data streams.

In the example of FIG. 7, the flowchart 700 continues to decision point 718 where it is determined whether metric$_{ic}$ is greater than metric$_{max}$. The determination could also be greater than or equal to, but that would mean additional operations to reset variables to a metric that is equal to the last best; so it would probably be slightly less desirable, if it is determined that the metric$_{ic}$ is greater than metric$_{max}$ (718-Y), then the flowchart 700 continues to module 720 with setting metric$_{max}$ to metric$_{ic}$ and freq$_{max}$ to $f_c$.

After module 720, or if it is determined that metric$_{ic}$ is not greater than metric$_{max}$ (718-N), then the flowchart 700 continues to decision point 722 where it is determined whether additional carrier frequencies are available. If it is determined that additional carrier frequencies are available (722-Y), then the flowchart continues to module 724 where $f_c$ is set to a next available carrier frequency and the flowchart 700 returns to module 704 and continues as described previously.

If, on the other hand, it is determined that no additional carrier frequencies are available, then the flowchart 700 continues to module 726 with tuning carrier frequency to freq$_{max}$ for data communication, and the flowchart 700 ends. In this way, the system can be tuned to the carrier frequency associated with the highest calculated performance metric.

Figure 8:
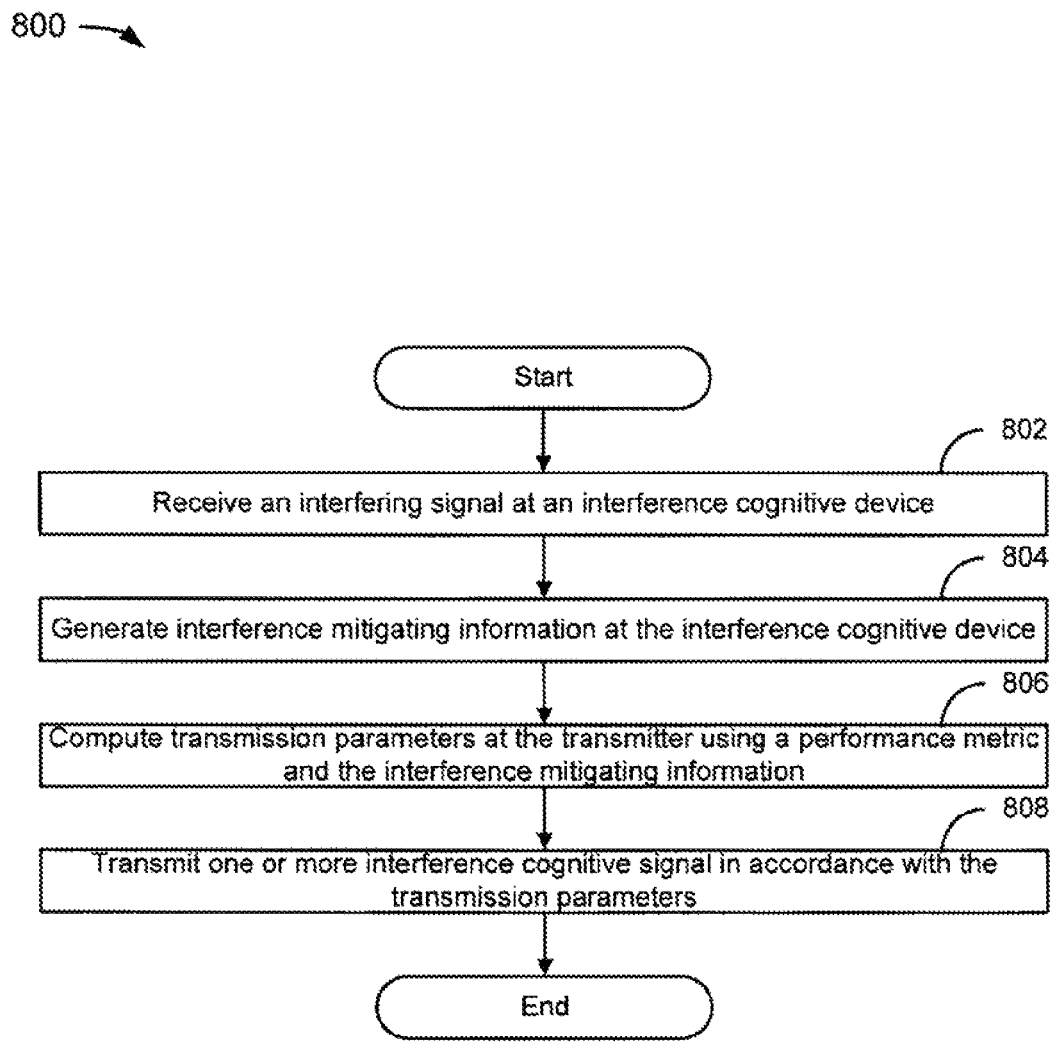
FIG. 8 depicts a flowchart of an example of a method for interference suppression at an ICT.

FIG. 8 depicts a flowchart 800 of an example of a method for interference suppression at an ICT. In the example of FIG. 8, the flowchart 800 starts at module 802 with receiving an interfering signal at an interference cognitive device. The interference cognitive device may be implemented as a receive chain (or partial receive chain) collocated with a transmitter at an ICT, or the interference cognitive device could be remote (or relatively remote) with respect to a transmitter such that the ICT includes a known or convenient transmitter technology and is interference cognitive due to its use in conjunction with the interference cognitive device.

In the example of FIG. 8, the flowchart 800 continues to module 804 with generating interference mitigating information at the cognitive device. The interference mitigating information may or may not take into account the performance metric associated with a relevant transmitter. However, if the interference cognitive device is collocated with a transmitter, it is reasonably likely, at least for the sake of simplicity, that the relevant performance metric be considered when generating the interference mitigating information, since the performance metric will need to be met anyway. (An antennae weighting matrix, if used, can be represented as M.)

In the example of FIG. 8, the flowchart 800 continues to module 806 with computing transmission parameters at the transmitter using a performance metric and the interference mitigating information. If the performance metric was already accounted for when generating the interference mitigating information, it need not necessarily be reconsidered. Advantageously, interference suppression at the transmitter can adapt to the quality of the interference mitigating information, while continuing to observe the relevant performance metric, (When applying the antennae weighting matrix, it may be desirable to apply $M^{1/2}$.)

In the example of FIG. 8, the flowchart 800 ends at module 808 with transmitting one or more interference cognitive signal in accordance with the transmission parameters. Although the flowchart 800 ends at this module, it should be noted that the flowchart 800 could repeat when a new (including changed) interfering signal is received (e.g., during an idle period).

Figure 9:
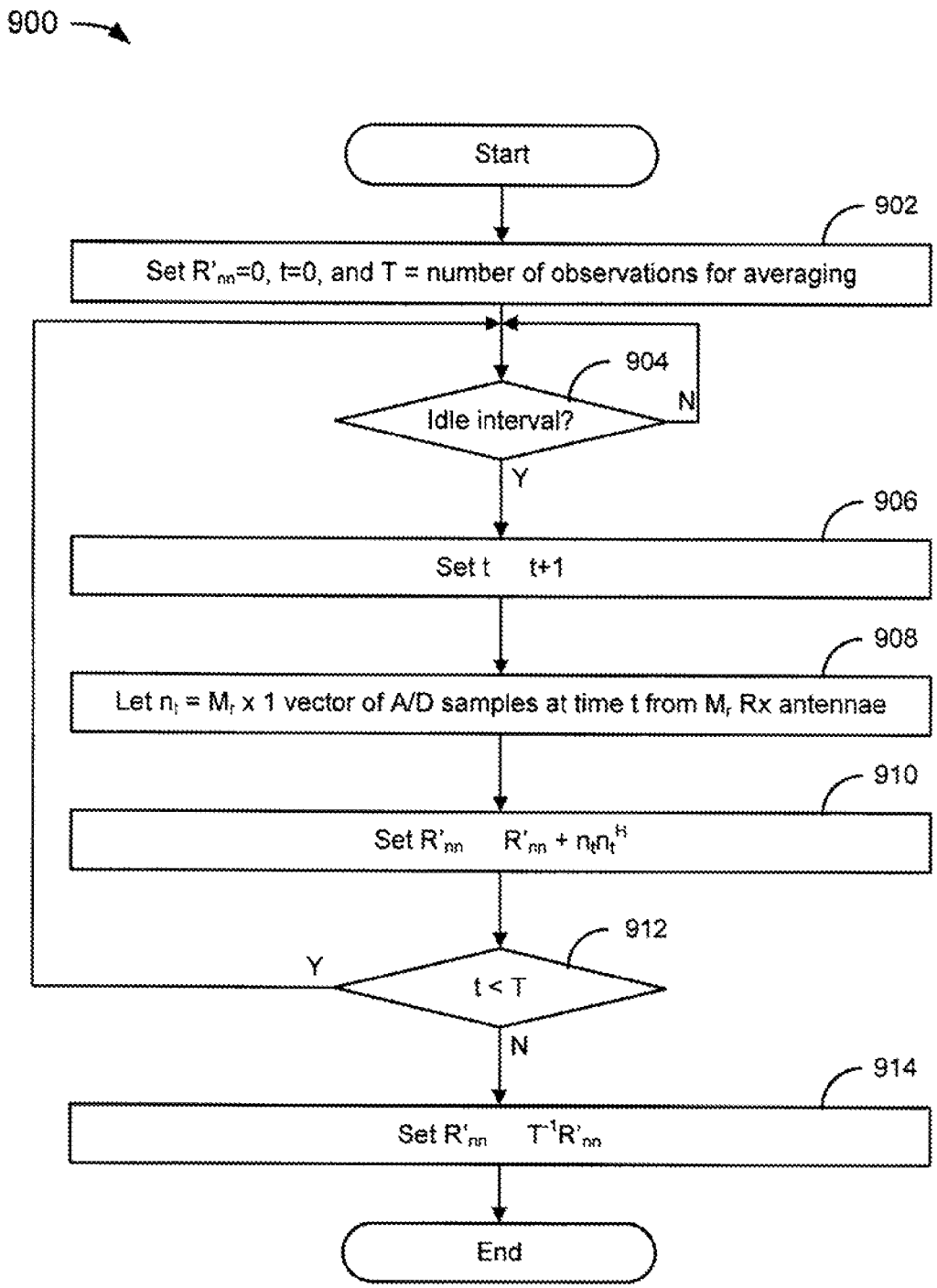
FIG. 9 depicts a flowchart of an example of a method for interference covariance estimation at a receiver.

FIG. 9 depicts a flowchart 900 of an example of a method for interference covariance estimation at a cognitive device. For illustrative simplicity, interference covariance is considered, though other characteristics of an interfering signal, a channel, or the like could be considered instead. In the example of FIG. 9, the flowchart 900 starts at module 902 with setting R'$_{nn}$=0, t=0, T=number of observations for averaging. R'$_{nn}$ is a covariance estimate that is initially set to the $M_r \times M_r$ zero matrix 0. t is a counter.

In the example of FIG. 9, the flowchart 900 continues to decision point 904 where is determined whether the receiver is in an idle interval. If the receiver is not in an idle interval (904-N), then the flowchart 900 loops back to decision point 904 until the receiver is in an idle interval. A receiver can monitor a channel to decide whether the system is idle (e.g., not transmitting or receiving signals). In this way, interference covariance will preferentially be calculated during idle intervals. If the receiver is in an idle interval (904-Y), then the flowchart 900 continues to module 906 where t is incremented. In this way, when an idle interval is detected, a counter is incremented.

In the example of FIG. 9, the flowchart 900 continues to module 908 where $n_t$ is set to $M_r \times 1$ vector of A/D samples at time t from $M_r$ Rx antennae. The samples received at time instant t by the $M_r$ A/D converters for Rx antennae are collected into an $M_r \times 1$ vector $n_t$.

In the example of FIG. 9, the flowchart 900 continues to module 910 where $R'_{nn}$ is set to $R'_{nn} + n_t n_t^H$. This updates the covariance estimate.

In the example of FIG. 9, the flowchart 900 continues to decision point 912 where it is determined whether t is less than T. If it is determined that t is less than T (912-Y), then the flowchart returns to decision point 904 and continues as described previously. If, on the other hand, it is determined that t is not less than T (912-N), then the flowchart 900 continues to module 914 where a final covariance estimate is obtained by multiplying the covariance estimate by inverse T: $R'_{nn} \leftarrow T^{-1} R'_{nn}$. An equivalent expression for the covariance estimate is:

$$\hat{R}_{nn} = \frac{1}{T} \sum_{t=1}^{T} n_i n_i^H.$$

Alternatively, a weighted instead of sample average could be used.

Figure 10:
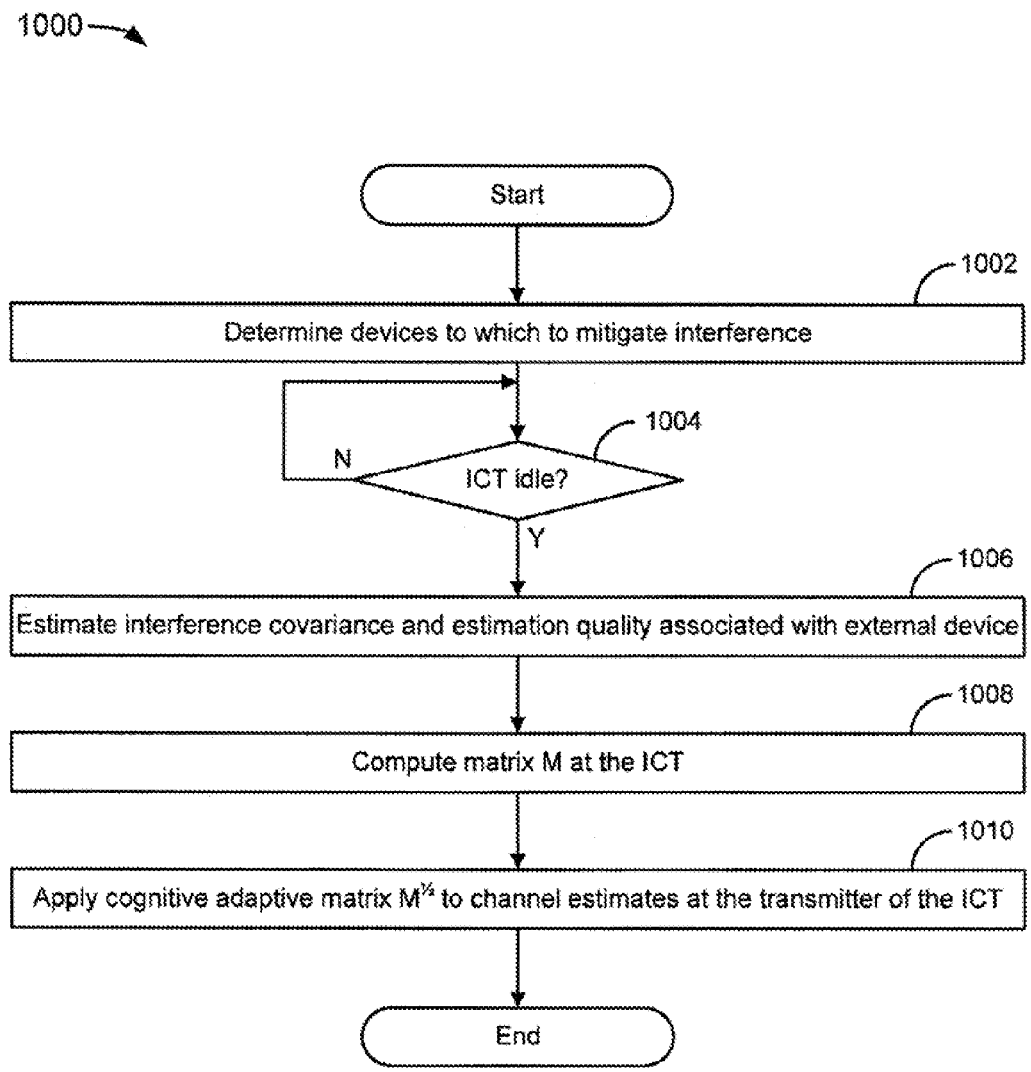
FIG. 10 depicts a flowchart of an example of a method of interference suppression to an external device.

FIG. 10 depicts a flowchart 1000 of an example of a method of interference suppression to an external device. In the example of FIG. 10, the flowchart 1000 starts at module 1002 with determining devices to which to mitigate interference. During idle periods, an interference cognitive device can detect undesired signals from an external device (or from an interfering transmitter to an external device). By reciprocity, the external device can also detect undesired signals from an ICT that includes or is associated with the interference cognitive device. The ICT can perform interference suppression to the detected external device.

In the example of FIG. 10, the flowchart 1000 continues to decision point 1004 where it is determined whether the ICT is idle. If it is determined that the ICT is not idle (1004-N), then the flowchart 1000 loops back to decision point 1004 until the ICT is idle. The ICT waits until both itself and a target receiver are idle. In an alternative, the ICT need not wait for an idle period. For example, if the cognitive device and transmitter of the ICT are not collocated, the cognitive device can monitor channels while the ICT is transmitting to the target receiver. The reason an ICT must normally wait for an idle period is that its own transmissions generally overpower any other signals. This problem is ameliorated by not collocating the cognitive device and the transmitter of the ICT, and could be ameliorated through other means. Thus, at least in theory, the decision point 1004 is optional.

When it is determined that the ICT is idle (1004-Y), the flowchart 1000 continues to module 1006 where interference covariance and estimation quality associated with the external device is estimated. If the cognitive device and the transmitter of the ICT are collocated, the ICT uses its receive chains to estimate, e.g., the interference covariance and estimation quality. By estimating the interference covariance at its own receiver, the ICT is able to measure the interference covariance from the external device to the ICT. By reciprocity, this interference covariance is equal to the interference covariance caused by the ICT to the external device. While directionality is the primary consideration in this example, other factors could be considered in addition or instead, such as power and signal format.

In the example of FIG. 10, the flowchart 1000 continues to module 1008 where the matrix M is computed at the ICT using suitable design criteria, examples of which are described in this document.

In the example of FIG. 10, the flowchart 1000 continues to module 1010 where the cognitive adaptive matrix $M^{1/2}$ is applied to channel estimates at the transmitter of the ICT. The matrix is cognitive because the transmitter identifies an external device to which to suppress interference. The matrix is adaptive because it adapts to interference. The channel estimates can be fed back from the target receiver. Advantageously, modified channel estimates can be used for transmit precoding to achieve interference suppression to the external device.

Figure 11:
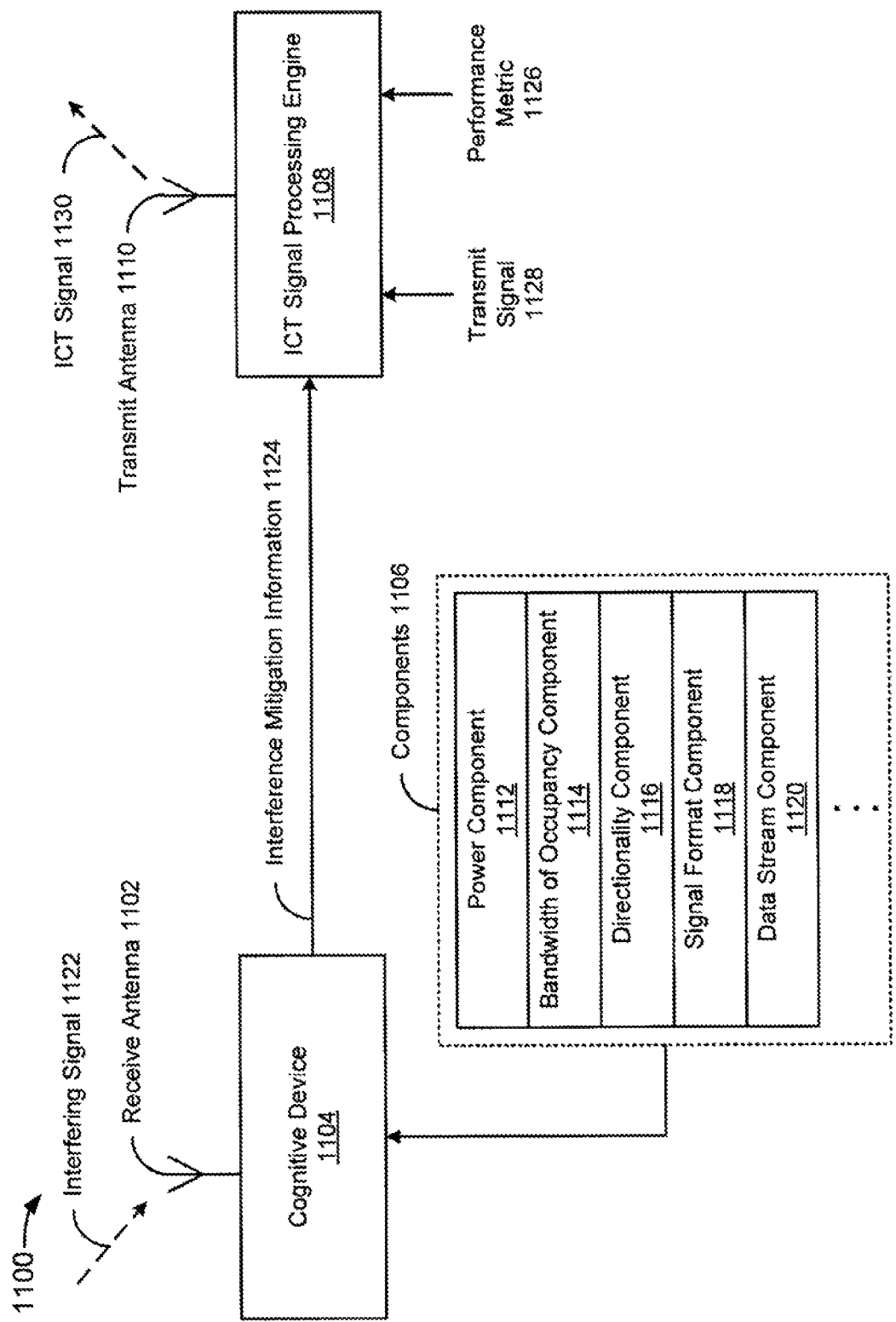
FIG. 11 depicts an example of an ICT system.

FIG. 11 depicts an example of an ICT system 1100. The system 1100 includes a receive antenna 1102, a cognitive device 1104, cognitive device components 1106, an ICT signal processing engine 1108, and a transmit antenna 1110.

The receive antenna 1102 can include applicable known or convenient antenna technology. For illustrative purposes in this example, the receive antenna 1102 is capable of receiving an interfering signal that is sent from an interfering transmitter to an interfering receiver. The received signal is referred to as an "interfering signal" because, also for illustrative purposes, the interfering signal is not intended for the receive antenna 1102 and is therefore heated as interference. Since the interfering signal has a structure and/or other characteristics that enable an interference cognitive device to learn about the intended recipient (the interfering receiver) of the signal, or about a later intended recipient (such as the interfering transmitter when it is in receive mode), an ICT can use information derived from the signal, channel, etc. to mitigate interference to the intended recipient. The receive antenna 1102 can be part of a station that includes some or all of the components illustrated in the example of FIG. 11, or the receive antenna 1102 can be relatively remote with respect to the transmit antenna 1110 and/or other components illustrated in the example of FIG. 11. Typically the receive antenna 1102 is going to be most useful for the purpose of determining interference near the transmit antenna 1110 if it is not too remote with respect to the transmit antenna 1110.

In the example of FIG. 11, the cognitive device 1104 is coupled to the receive antenna 1102. The cognitive device 1104 may or may not be collocated on a station with the receive antenna 1102. Also, the cognitive device 1104 can be distributed in the sense that some parts of the cognitive device are collocated on a station with the receive antenna 1102 for analyzing the signal and channel characteristics, and other parts of the cognitive device 1104 are at a server, which can include data about the interfering transmitter, interfering receiver, other stations in a wireless network, an interference map of an interference cognitive network, or some other related data.

In the example of FIG. 11, the cognitive device components 1106 are coupled to the cognitive device 1104. The cognitive device components 1106 may or may not be collocated on a station with the cognitive device 1104. Also, the cognitive device components 1106 can be distributed. The cognitive device components include, by way of example but not limitation, a power component 1112, a bandwidth of occupancy component 1114, a directionality component 1116, a signal format component 1118, a data stream component 1120, etc. The power component 1112 will typically include filters, and may include hardware in the analog or digital domains. The bandwidth of occupancy component 1114 can include a wideband filter or one or more narrowband filters that parse a band for "holes" or for other reasons. The directionality component 1116 will typically include engines for processing interference covariance values. The signal format component 1118 can include demappers for matching an interfering signal to known signal formats, modulators, or the signal format component 1118 could rely upon data provided by the interfering transmitter or interfering receiver. The data stream component 1120 could include demodulators for data stream analysis. These examples are provided by way of example because a listing of all possible component variations would be difficult.

In the example of FIG. 11, the ICT signal processing engine 1108 is coupled to the cognitive device 1104. The ICT signal processing engine 1108 has a design goal of processing a transmit signal such that it mitigates interference to a known external device, while still transmitting the signal in accordance with a performance metric. In this way, the system 1100 can enable an ICT to act as a good neighbor within performance parameters associated with the performance metric.

In the example of FIG. 11, the transmit antenna 1110 is coupled to the ICT signal processing engine 1108. The transmit antenna 1110 can include applicable known or convenient antenna technology. Also, the transmit antenna 1110 and the receive antenna 1102 could be the same antenna device, where the receive antenna 1102 is the antenna device in a receive mode and the transmit antenna 1110 is the antenna device in a transmit mode. Similarly, the receive antenna 1102 and the transmit antenna 1110 could comprise an antenna array that is capable of using the antennae for either sending or receiving. Alternatively, the receive antenna 1102 and the transmit antenna 1110 could be completely different devices, and could in fact be remote with respect to one another.

In the example of FIG. 11, in operation, the receive antenna 1102 detects an interfering signal 1122. The cognitive device 1104 uses one or more of the cognitive device components 1106 to learn about the interfering signal 1122 (either directly by analysis of the signal or through some other means, such as a server that knows about the interfering transmitter of the interfering signal 1122). The cognitive device 1104 sends interference mitigation information 1124 to the ICT signal processing engine 1108, which also has (or receives) a performance metric 1126. It may be noted that the cognitive device could also include a performance metric, but since it has already been noted that the various components can be distributed, it is equivalent to state that the ICT signal processing engine includes a performance metric. That said, it is possible that the performance metric would be used for the purpose of generating the interference mitigation information 1124. So in an alternative, the performance metric 1126 is also (or instead) provided to the cognitive device 1104.

In the example of FIG. 11, in operation, a transmit signal 1128 is received at the ICT signal processing engine 1108. For illustrative purposes, the ICT signal processing engine 1108 is in a transmit chain, and could be coupled to one or more components at one or more locations in the chain (e.g., at a precoding engine, at a controller in the analog domain, etc.). In one implementation, the interference mitigation information 1124 and the performance metric 1126 have been pre-processed to enable application of, e.g., a precomputed matrix to the transmit signal 1128. It is also possible, though perhaps less likely, that additional computations are done when characteristics of the transmit signal 1128 become known. In any case, the transmit signal 1128 is processed and sent on the transmit antenna 1110 as an ICT signal 1130. The signal is an ICT signal because it takes into account interference that the signal could cause to other devices.

It may be noted that the receive antenna 1102 and the transmit antenna 1110 could be implemented as antennae arrays. In such a case, an 10T signal 1130 could be described as sent on an antennae array.

Systems described herein may be implemented on any of many possible hardware, firmware, and software systems. Algorithms described herein are implemented in hardware, firmware, and/or software that is implemented in hardware. The specific implementation is not critical to an understanding of the techniques described herein and the claimed subject matter.

As used in this paper, an engine includes a dedicated or shared processor and, hardware, firmware, or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

As used in this paper, the term "embodiment" means an embodiment illustrate by way of example but not necessarily by limitation.

It will be appreciated to those skilled in the art that the precoding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:
1. A system comprising:
an antenna array, including a receive antenna;
a cognitive device coupled to the receive antenna;
an interference-cognitive transmitter (ICT) signal processing engine coupled to the cognitive device;
a transmit antenna coupled to the ICT signal processing engine;
a plurality of receive radio frequency (RF) chains coupled to the antennae array;

a plurality of analog-to-digital (A/D) converters coupled to the plurality of receive RF chains and to a matrix-vector multiplication engine;
a receive antennae weighting engine, coupled to the antennae array, including:
  a weighting matrix computation engine;
  a matrix multiplication engine coupled to the weighting matrix computation engine;
  a matrix-vector multiplication engine coupled to the weighting matrix computation engine;
an equalizer coupled to the matrix multiplication engine and the matrix-vector multiplication engine;
a plurality of constellation demappers coupled to the equalizer;
a plurality of bit deinterleavers coupled to the plurality of constellation demappers;
a buffer coupled to the plurality of bit deinterleavers;
a forward error correction (FEC) decoder coupled to the buffer;
wherein, in operation:
  the receive antenna provides an interfering signal to the cognitive device;
  the cognitive device derives interference mitigation information from the interfering signal, wherein the interference mitigation information enables a transmitter to mitigate interference to a device associated with the interfering signal;
  the ICT signal processing engine uses the interference mitigation information and a performance metric to compute parameters for a signal;
  the transmit antenna provides an ICT signal from the ICT signal processing engine, wherein the ICT signal is generated using a transmit signal and the computed parameters;
  the antennae array provides received analog signals to the receive RF chains;
  the A/D converters convert the analog signals into the received vector;
  the weighting matrix computation engine generates a weighting matrix using an interference covariance metric and a performance metric;
  the matrix multiplication engine generates a precoding matrix using a channel estimate and the weighting matrix;
  the matrix-vector multiplication engine generates a weighted vector using a received vector and the weighting matrix, wherein the received vector is associated with interference from an external device received on the antennae array;
  the equalizer generates an equalized vector using the precoding matrix and the weighted vector, wherein data bits are derived from the equalized vector; the constellation demappers demap the equalized vector; and
  the bit deinterleavers deinterleave the result of the constellation demappers into the buffer, the FEC decoder decodes the value in the buffer to obtain data bits.

2. The system of claim 1, further comprising:
an interference covariance engine, wherein, in operation, the interference covariance engine provides the interference covariance metric to the weighting matrix computation engine;
a channel estimation engine, wherein, in operation, the channel estimation engine provides a modified channel estimate to the matrix multiplication engine;
an estimation quality engine coupled to the interference covariance engine, wherein, in operation, the estimation quality engine augments the interference covariance metric;
a performance metric engine, wherein, in operation, the performance metric engine provides the performance metric to the weighting matrix computation engine;
a controller, wherein, in operation:
  the controller tunes to each of a plurality of carrier frequencies;
  the performance metric engine computes performance metrics using channel state information (CSI) and interference covariance information associated with each of the plurality of carrier frequencies; the controller tunes to the carrier frequency that had the best performance metric for data communication;
an interference-cognitive transmitter for sending the transmission received on the antennae array.

3. The system of claim 1, further comprising:
an interference covariance engine, wherein, in operation, the interference covariance engine provides the interference covariance metric to the weighting matrix computation engine;
a channel estimation engine, wherein, in operation, the channel estimation engine provides a modified channel estimate to the matrix multiplication engine;
an estimation quality engine coupled to the interference covariance engine, wherein, in operation, the estimation quality engine augments the interference covariance metric;
a performance metric engine, wherein, in operation, the performance metric engine provides the performance metric to the weighting matrix computation engine;
a controller, wherein, in operation:
  the controller determines whether antennae array is, at least in part, idle;
  updating a covariance estimate using samples gathered while the antennae array is, at least in part, idle, until an observation threshold is reached;
an interference-cognitive transmitter for sending the transmission received on the antennae array.

4. The system of claim 1, further comprising:
an interference covariance engine, wherein, in operation, the interference covariance engine provides the interference covariance metric to the weighting matrix computation engine;
a channel estimation engine, wherein, in operation, the channel estimation engine provides a modified channel estimate to the matrix multiplication engine;
an estimation quality engine coupled to the interference covariance engine, wherein, in operation, the estimation quality engine augments the interference covariance metric;
a performance metric engine, wherein, in operation, the performance metric engine provides the performance metric to the weighting matrix computation engine;
a controller, wherein, in operation:
  the controller determines whether an automatic gain control (AGC) has been triggered;
  when the AGC is triggered:
    determining that a packet from a source is not valid;
    estimating interference covariance associated with the source;
    performing interference suppression so that the AGC does not trigger upon receipt of another invalid packet from the source;
    resetting the AGC and a receive state machine;

an interference-cognitive transmitter for sending the transmission received on the antennae array.

5. The system of claim 1, further comprising:
an interference covariance engine, wherein, in operation, the interference covariance engine provides the interference covariance metric to the weighting matrix computation engine;
a channel estimation engine, wherein, in operation, the channel estimation engine provides a modified channel estimate to the matrix multiplication engine;
an estimation quality engine coupled to the interference covariance engine, wherein, in operation, the estimation quality engine augments the interference covariance metric;
a performance metric engine, wherein, in operation, the performance metric engine provides the performance metric to the weighting matrix computation engine;
a controller, wherein, in operation:
  the controller determines whether an automatic gain control (AGC) has been triggered;
  when the AGC is triggered:
    incrementing a count if a packet received from a source is invalid; if the count reaches a maximum count threshold in a time interval,
    estimating interference covariance and performing interference suppression so that the AGC does not trigger upon receipt of another invalid packet from the source;
    resetting the AGC and a receive state machine;
an interference-cognitive transmitter for sending the transmission received on the antennae array.

* * * * *